(12) United States Patent  (10) Patent No.: US 8,611,819 B2
Lee et al.  (45) Date of Patent: Dec. 17, 2013

(54) MOBILE TERMINAL AND CONTROLLING METHOD THEREOF

(75) Inventors: Dong Hyun Lee, Seoul (KR); Chang Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 12/533,152

(22) Filed: Jul. 31, 2009

(65) Prior Publication Data

US 2010/0178873 A1     Jul. 15, 2010

(30) Foreign Application Priority Data

Jan. 12, 2009  (KR) .................. 10-2009-0002418

(51) Int. Cl.
    *H04B 7/00*  (2006.01)

(52) U.S. Cl.
    USPC ..................................... 455/41.2; 455/456.1

(58) Field of Classification Search
    USPC .............. 455/41.1, 41.2, 41.3, 456.1, 456.2, 455/456.3, 457, 458
    See application file for complete search history.

(56) References Cited

U.S. PATENT DOCUMENTS

| 7,289,813 | B2 * | 10/2007 | Karaoguz ................ 455/456.1 |
| 2005/0073522 | A1 * | 4/2005 | Aholainen et al. ........... 345/440 |
| 2006/0101350 | A1 * | 5/2006 | Scott ............................ 715/779 |
| 2009/0117848 | A1 * | 5/2009 | Nagata et al. ................ 455/41.2 |
| 2010/0041334 | A1 * | 2/2010 | Engelsma et al. ........... 455/41.2 |

\* cited by examiner

*Primary Examiner* — Ping Hsieh
(74) *Attorney, Agent, or Firm* — KED & Associates, LLP

(57) ABSTRACT

A mobile terminal and controlling method may be provided by which a specific one of various external devices neighboring a mobile terminal may be easily searched and may be connected to the mobile terminal by short-range communication.

33 Claims, 29 Drawing Sheets

FIG. 21
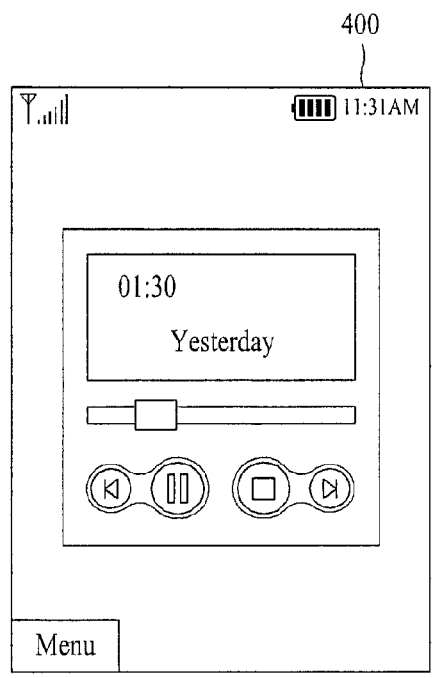
(21-1)
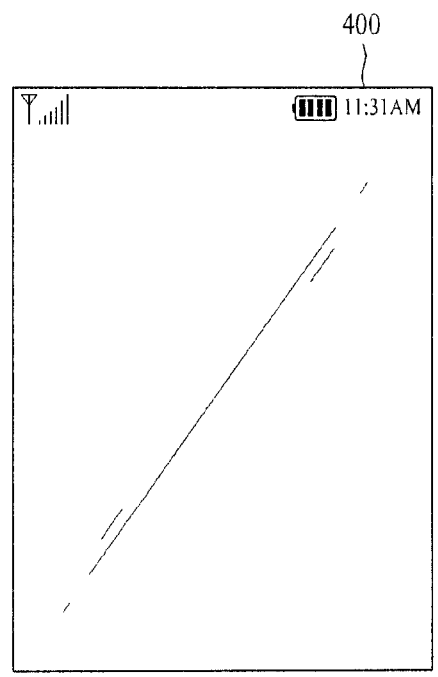
(21-2)
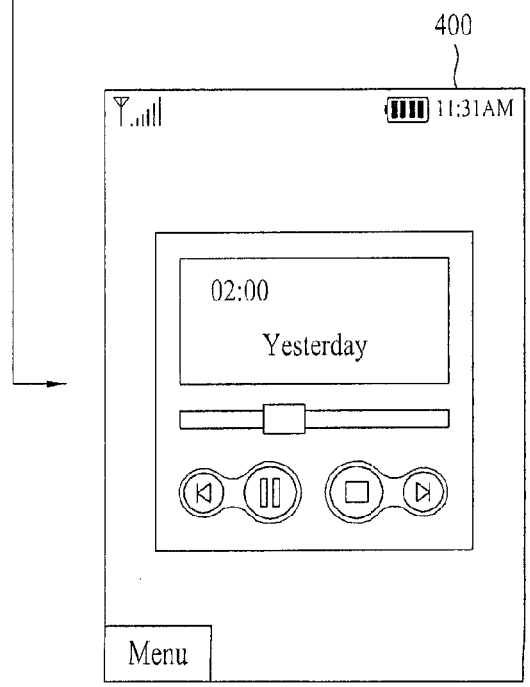
(21-3)

FIG. 22
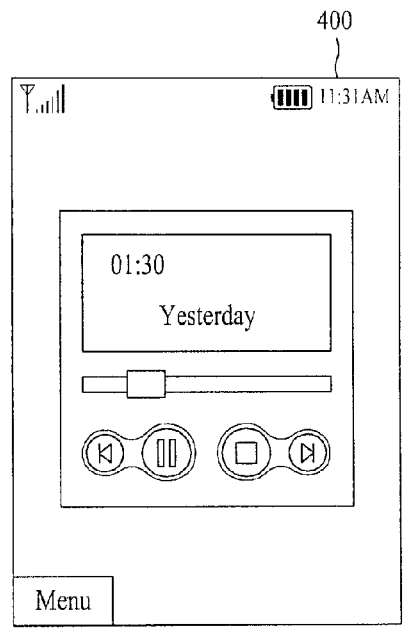
(22-1)
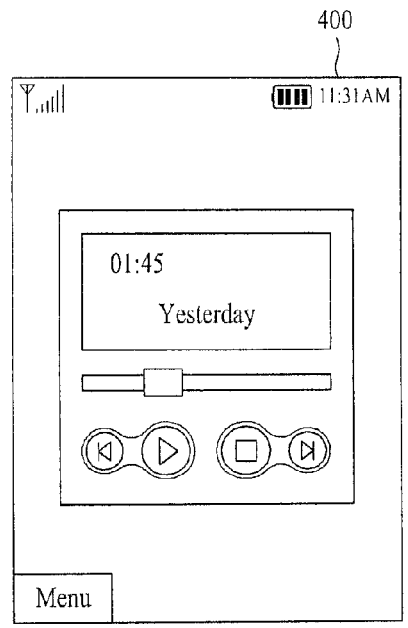
(22-2)
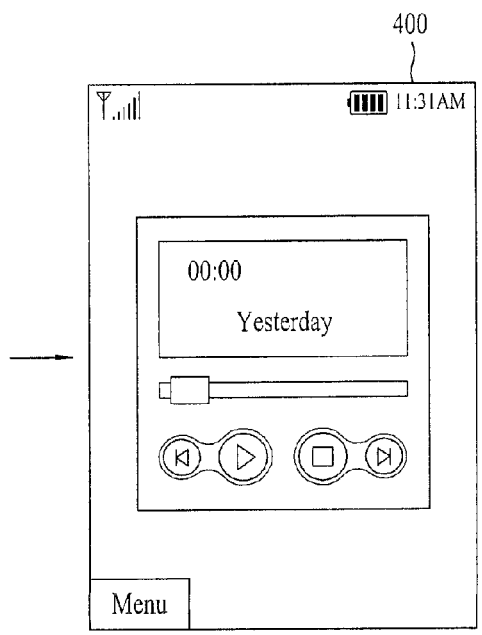
(22-3)
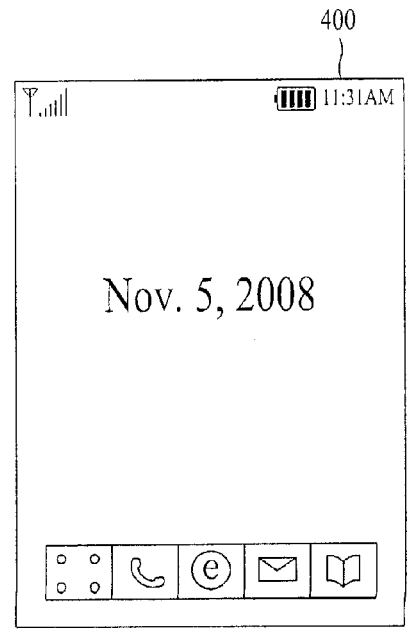
(22-4)

FIG. 29
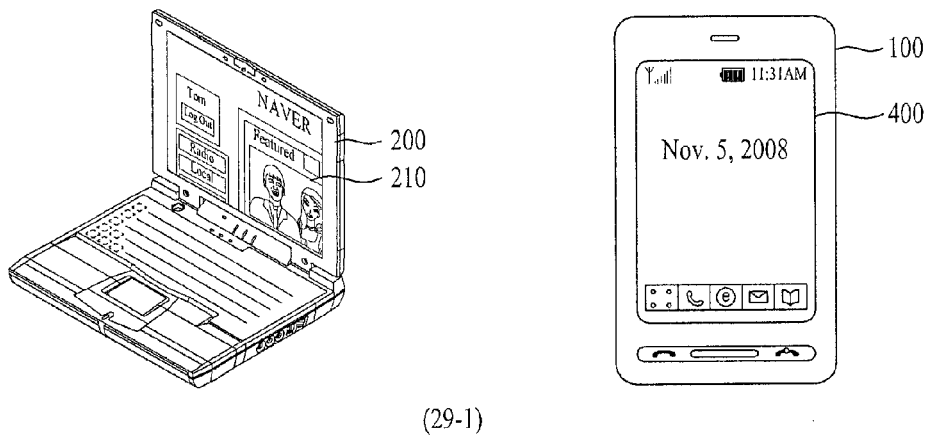
(29-1)
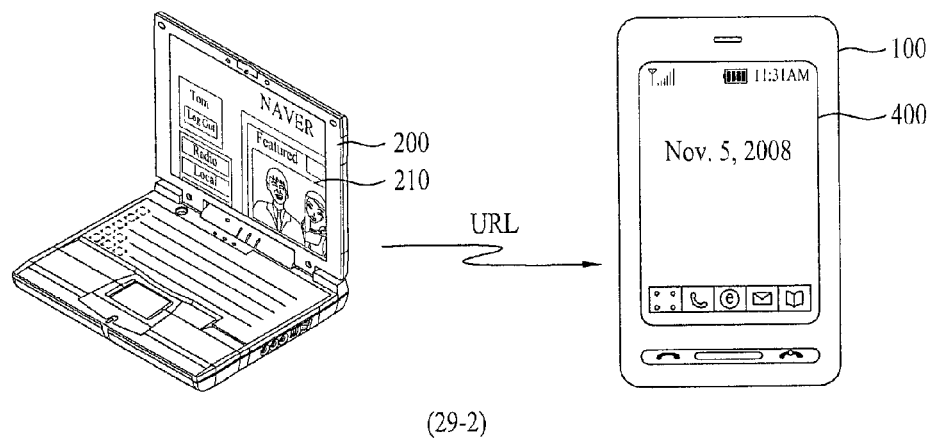
(29-2)
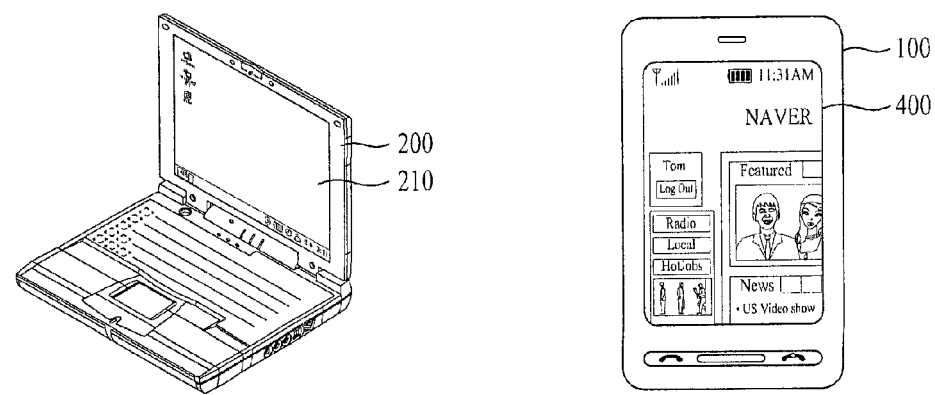
(29-3)

MOBILE TERMINAL AND CONTROLLING METHOD THEREOF

This application claims benefit and priority from Korean Application No. 10-2009-0002418, filed Jan. 12, 2009, the subject matter of which is incorporated herein by reference.

BACKGROUND

1. Field

Embodiments of the present invention may relate to a mobile terminal and a controlling method thereof.

2. Background

A mobile terminal may be configured to perform various functions. Examples of such functions may include data and voice communications, capturing images and video via a camera, recording audio, playing music files and outputting music via a speaker system, and displaying images and video on a display. Terminals may include additional functionality that support game playing, while other terminals may also be configured as multimedia players. Mobile terminals may receive broadcast and multicast signals that permit viewing of contents, such as videos and television programs.

Terminals may be classified into mobile terminals and stationary terminals according to a presence or non-presence of mobility. The mobile terminals may be further classified into handheld terminals and vehicle mount terminals according to availability for hand-carry.

Efforts are ongoing to support and increase functionality of mobile terminals. The efforts include software and hardware improvements, as well as changes and improvements in structural components that form the mobile terminal.

BRIEF DESCRIPTION OF THE DRAWINGS

Embodiments and arrangements may be described in detail with reference to the following drawings in which like reference numerals refer to like elements and wherein:

FIGS. 21 to 27 are diagrams of a display screen of a mobile terminal according to a third embodiment of the present invention is implemented;

FIG. 29 is a diagram of a mobile terminal and an external device between which a short-range communication connection is established according to a fourth embodiment of the present invention.

DETAILED DESCRIPTION

Figure 1:
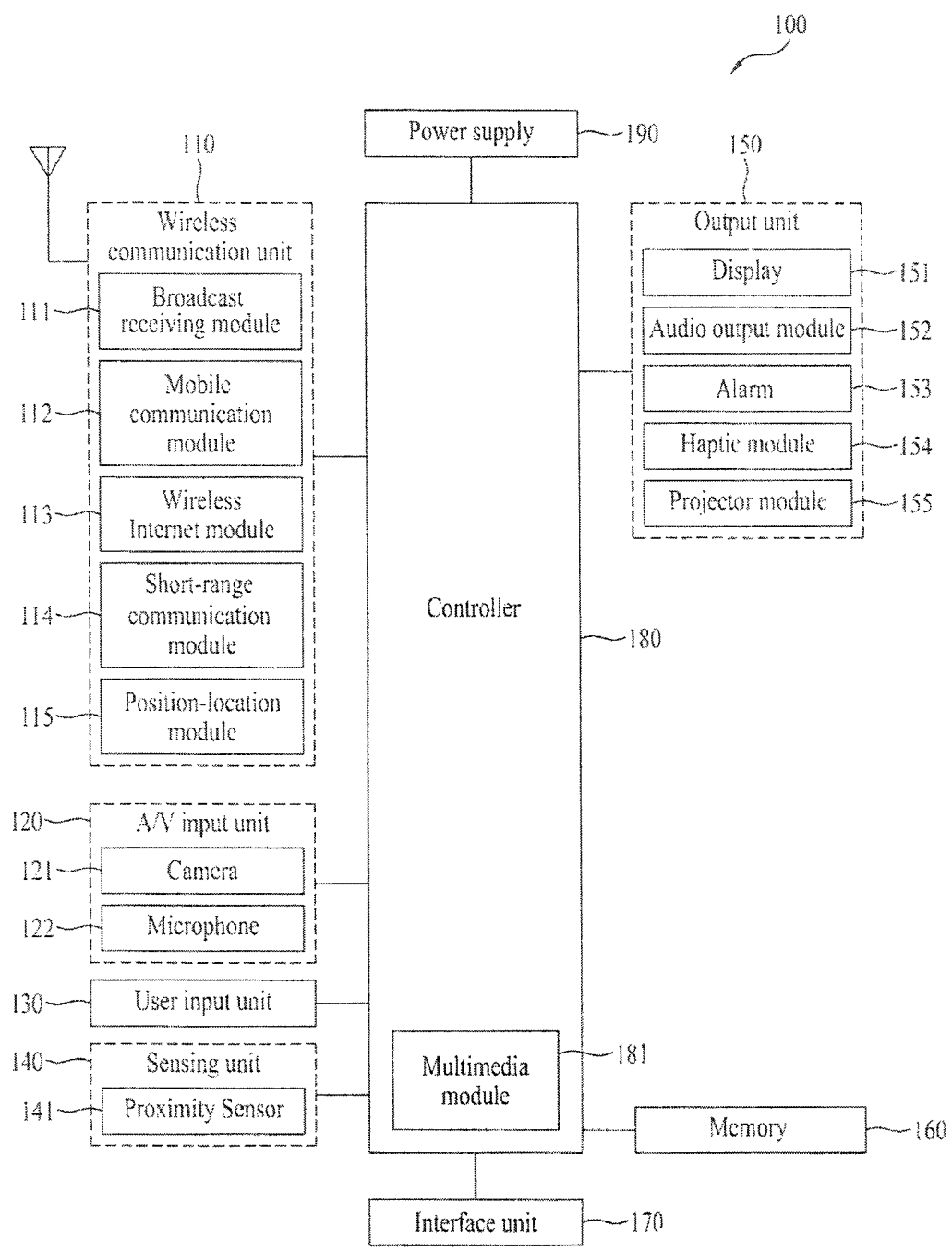
FIG. 1 is a block diagram of a mobile terminal according to an example embodiment.

A terminal may be equipped with a function of connection to an external device via a short-range communication such as Bluetooth. As a number of external devices capable of short-range communications increases, there may be demand for a method of enabling a terminal to be connected to a specific external device by short-range communication by facilitating a search for the specific one of a number of external devices around the terminal. When the terminal is connected to the specific external device by short-range communication, an execution function of the terminal may need to be changed to consider a user's convenience according to a variation of a physically spaced distance between the terminal and the specific external device.

Embodiments of the present invention may provide a mobile terminal and controlling method thereof by which a short-range communication connection between a terminal and a specific external device can be established in a manner of facilitating a search for a specific one of a number of external devices around the terminal.

Embodiments of the present invention may provide a mobile terminal and controlling method thereof, by which an execution function of the terminal can be changed according to a variation of a physically spaced distance between the terminal and the specific external device when the mobile terminal is connected to the specific external device by short-range communication.

A mobile terminal may include a user input unit, a display, a wireless communication unit, and a control unit configured to externally transmit a paging signal of a prescribed magnitude corresponding to a prescribed spaced distance via the wireless communication unit in order to search for an external device within the prescribed spaced distance. The control unit may control the external device responding to the paging signal to be displayed on the display.

A method of controlling a mobile terminal may include externally transmitting a paging signal of a prescribed magnitude corresponding to a prescribed spaced distance in order to search for an external device within the prescribed spaced distance, and displaying the external device responding to the paging signal.

A mobile terminal may include a wireless communication unit to perform a short-range communication with an external device and a control unit controlling an operation of at least one execution function to be changed according to a short-range communication signal strength varying according to a spaced distance from the external device.

A method of controlling a mobile terminal may include performing a short-range communication with an external device and controlling an operation of at least one execution function to be changed according to a short-range communication signal strength varying according to a spaced distance from the external device.

Reference will now be made in detail to preferred embodiments of the present invention, examples of which are illustrated in the accompanying drawings. It is to be understood by those of ordinary skill that other embodiments may be utilized, and structural, electrical, as well as procedural changes may be made without departing from the scope of embodiments. The same reference numbers may be used throughout the drawings to refer to the same or like parts.

As used herein, the suffixes 'module', 'unit' and 'part' may be used for elements in order to facilitate the disclosure only. Therefore, significant meanings or roles are not given to the suffixes themselves and it is understood that the 'module', 'unit' and 'part' can be used together or interchangeably.

Embodiments of the present invention may be applicable to a various types of terminals. Examples of such terminals include mobile terminals as well as stationary terminals, such as mobile phones, user equipment, smart phones, DTV, computers, digital broadcast terminals, personal digital assistants, portable multimedia players (PMP) and navigators.

A further description may be provided with regard to a mobile terminal, and such teachings may apply equally to other types of terminals.

FIG. 1 is a block diagram of a mobile terminal in accordance with an example embodiment. Other embodiments and arrangements may also be provided. FIG. 1 shows a mobile terminal 100 that includes a wireless communication unit 110, an A/V (audio/video) input unit 120, a user input unit 130, a sensing unit 140, an output unit 150, a memory 160, an interface unit 170, a controller 180, and a power supply 190. FIG. 1 shows the mobile terminal 100 having various components, although other components may also be used. More or less components may alternatively be implemented.

The wireless communication unit 110 may include one or more components that permit wireless communication between the mobile terminal 100 and a wireless communication system or a network within which the mobile terminal 100 is located. For example, the wireless communication unit 110 may include a broadcast receiving module 111, a mobile communication module 112, a wireless Internet module 113, a short-range communication module 114, and a position-location module 115.

The broadcast receiving module 111 may receive a broadcast signal and/or broadcast associated information from an external broadcast managing server (or entity) via a broadcast channel.

The broadcast channel may include a satellite channel and a terrestrial channel.

The broadcast managing server may refer to a server (or system) that generates and transmits a broadcast signal and/or broadcast associated information or a server that is provided with a previously generated broadcast signal and/or broadcast associated information and then transmits the provided signal or information to a terminal. The broadcast signal may be a TV broadcast signal, a radio broadcast signal, and/or a data broadcast signal. The broadcast signal may further include a broadcast signal combined with a TV signal or a radio broadcast signal.

Two or more broadcast receiving modules 111 may be provided in the mobile terminal 100 to pursue simultaneous reception of at least two broadcast channels or to facilitate broadcast channel switching.

The broadcast associated information may include information associated with a broadcast channel, a broadcast program, a broadcast service provider, etc. The broadcast associated information may be provided via a mobile communication network. The broadcast associated information may be received by the mobile communication module 112.

The broadcast associated information may be implemented in various forms. For example, broadcast associated information may include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), DVB-CBMS, OMA-BCAST, a data broadcasting system known as media forward link only (MediaFLO®) and integrated services digital broadcast-terrestrial (ISDB-T). The broadcast receiving module 111 may be suitable for other broadcasting systems as well as the above-explained digital broadcasting systems.

The broadcast signal and/or broadcast associated information received by the broadcast receiving module 111 may be stored in the memory 160.

The mobile communication module 112 may transmit/receive wireless signals to/from one or more network entities (e.g., a base station, an external terminal, a server, etc.). The wireless signals may represent audio, video, and data according to text/multimedia message transceivings, etc.

The wireless Internet module 113 may support Internet access for the mobile terminal 100. This wireless Internet module 113 may be internally or externally coupled to the mobile terminal 100. The wireless Internet technology may include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate short-range communications. Suitable technologies for implementing the short-range communication module 114 may include radio frequency identification (FID), infrared data association (IrDA), ultra-wideband (WB), as well as networking technologies such as Bluetooth and ZigBee.

The position-location module 115 may identify or otherwise obtain a location of the mobile terminal 100. The position-location module 115 may be implemented with a global positioning system (GPS) module.

The audio/video (A/V) input unit 120 may provide audio or video signal input to the mobile terminal 100. The A/V input unit 120 may include a camera 121 and a microphone 122, for example. The camera 121 may receive and process image frames of still pictures and/or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. At least two cameras 121 may be provided on the mobile terminal 100 according to environment of usage.

The microphone 122 may receive an external audio signal while the portable terminal 100 is in a particular mode, such as a phone call mode, a recording mode and/or a voice recognition mode. The received audio signal may be processed and converted into electric audio data. The processed audio data may be transformed into a format transmittable to a mobile communication base station via the mobile communication module 112 in case of a call mode. The microphone 122 may include noise removing algorithms (or noise cancelling algorithms) to remove noise generated in the course of receiving the external audio signal.

The user input unit 130 may generate input data responsive to user manipulation of an associated input device or devices. Examples of such devices may include a keypad, a dome switch, a touchpad (e.g., static pressure/capacitance), a jog wheel, and/or a jog switch, etc.

The sensing unit 140 may provide sensing signals for controlling operations of the mobile terminal 100 using status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and an orientation or acceleration/deceleration of the mobile terminal 100. As an example, the mobile terminal 100 may be configured as a slide-type mobile terminal. In such a configuration, the sensing unit 140 may sense whether a sliding portion of the mobile terminal 100 is open or closed. The sensing unit 140 may also sense a presence or absence of power provided by the power supply 190, a presence or absence of a coupling or other connection between the interface unit 170 and an external device, etc. The sensing unit 140 may also include a proximity sensor 141.

The output unit 150 may generate outputs relevant to senses of sight, hearing, touch and the like. The output unit 150 may include a display 151, an audio output module 152, an alarm 153, a haptic module 154, a projector module 155 and the like.

The display 151 may visually display (output) information associated with the mobile terminal 100. For example, when the mobile terminal 100 is operating in a phone call mode, the display 151 may provide a user interface (UI) or a graphical user interface (GUI) that includes information associated with placing, conducting, and/or terminating a phone call. As another example, when the mobile terminal 100 is in a video call mode or a photographing mode, the display 151 may additionally or alternatively display images that are associated with these modes, the UI or the GUI.

The display 151 may be implemented using known display technologies including a liquid crystal display (LCD), a thin film transistor-liquid crystal display (TFT-LCD), an organic light-emitting diode display (OLED), a flexible display and a three-dimensional display, for example. The mobile terminal 100 may include one or more displays.

The above described displays may be implemented as a transparent or optical transmittive type that may be called a transparent display. As one example, a transparent OLED (TOLED) may be used as the transparent display. A rear configuration of the display 151 may be used as the optical transmittive type. In this configuration, a user may see an object in rear of a terminal body via the area occupied by the display 151 of the terminal body.

At least two displays 151 may be provided on the mobile terminal 100 in accordance with an implemented configuration of the mobile terminal 100. For example, a plurality of displays can be arranged on a single face of the mobile terminal 100 by being spaced apart from each other or by being built in one body. Alternatively, a plurality of displays can be arranged on different faces of the mobile terminal 100.

In an example that the display 151 and a sensor for detecting a touch action (hereafter called a touch sensor) are configured in a mutual layer structure (hereafter called a touchscreen), the display 151 may be used as an input device as well as an output device. The touch sensor may be configured as a touch film, a touch sheet, a touchpad and/or the like.

The touch sensor may be configured to convert a pressure applied to a specific portion of the display 151 or a variation of a capacitance generated from a specific portion of the display 151 to an electric input signal. The touch sensor may also be configured to detect a pressure of a touch as well as a touched position and/or size.

If a touch input is made to the touch sensor, signal(s) corresponding to the touch may be transferred to a touch controller. The touch controller processes the signal(s) and then transfers the processed signal(s) to the controller 180. Therefore, the controller 180 may know whether a prescribed portion of the display 151 is touched.

The proximity sensor 141 may be provided at an internal area of the mobile terminal 100 enclosed by the touchscreen or around the touchscreen. The proximity sensor 141 may detect a presence or non-presence of an object approaching a prescribed detecting surface or a presence or non-presence of an object existing around the proximity sensor 141 using an electromagnetic field strength or infrared rays without mechanical contact. The proximity sensor 141 may have a longer durability than a contact type sensor. The proximity sensor 141 may also have a wider utility than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touchscreen includes the electrostatic capacity proximity sensor, it may detect the proximity of a pointer using a variation of electric field according to proximity of the pointer. In this case, the touchscreen (touch sensor) may be classified as the proximity sensor.

An action that a pointer approaches without contacting the touchscreen may be called a proximity touch. An action that a pointer actually touches the touchscreen may be called a contact touch. The position on the touchscreen that is proximity-touched by the pointer may be the position of the pointer that vertically opposes the touchscreen when the pointer makes the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touchscreen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output audio relating to a particular function (e.g., call received, message received, etc.). The audio output module 152 may be implemented using one or more speakers, buzzers, other audio producing devices, and/or combinations thereof.

The alarm 153 may output a signal for announcing an occurrence of a particular event associated with the mobile terminal 100. The alarm events may include a call received event, a message received event and/or a touch input received event. The alarm 153 may output a signal for announcing the event occurrence by way of vibration as well as video or audio signals. The video or audio signals may be outputted via the display 151 and/or the audio output unit 152. The display 151 and/or the audio output module 152 may be considered as part of the alarm 153.

The haptic module 154 may generate various tactile effects that can be sensed by a user. Vibration may be one of the tactile effects generated by the haptic module 154. Strength and pattern of the vibrations generated by the haptic module 154 may be controllable. For example, different vibrations can be outputted in a manner of being synthesized together or can be outputted in sequence.

The haptic module 154 may generate various tactile effects as well as the vibration. For example, the haptic module 154 may generate an effect attributed to the arrangement of pins vertically moving against a contact skin surface, an effect attributed to injection/suction power of air though an injection/suction hole, an effect attributed to a skim over a skin surface, an effect attributed to contact with an electrode, an effect attributed to an electrostatic force, an effect attributed to representation of hot/cold sense using an endothermic or exothermic device and the like.

The haptic module 154 may enable a user to sense the tactile effect through a muscle sense of a finger, an arm or the like as well as to transfer the tactile effect through a direct contact. At least two haptic modules 154 may be provided on the mobile terminal 100 in accordance with the corresponding configuration type of the mobile terminal 100.

The projector module 155 may perform an image projector function using the mobile terminal 100. The projector module 155 may display an image that is identical to or partially different from at least an image displayed on the display 151, on an external screen and/or a wall according to a control signal of the controller 180.

The projector module 155 may include a light source (not shown) that generates light (e.g., laser) for projecting an image externally, an image producing means (not shown) for producing an image to output externally using the light generated from the light source, and/or a lens (not shown) for enlarging to output the image externally in a predetermined focus distance. The projector module 155 may further include a device (not shown) for adjusting an image projected direction by mechanically moving the lens and/or the whole module.

The projector module 155 may be classified as a cathode ray tube (CRT) module, a liquid crystal display (LCD) module, a digital light processing (DLP) module or the like according to a device type of a display means. The DLP module may operate by enabling light generated from the light source to reflect on a digital micro-mirror device (DMD) chip and can be advantageous for downsizing the projector module 155.

The projector module 155 may be provided in a length direction of a lateral, front and/or backside direction of the mobile terminal 100. The projector module 155 may be provided at any portion of the mobile terminal 100.

The memory 160 may store various types of data to support processing, control, and/or storage requirements of the mobile terminal 100. The data may include program instructions for applications operating on the mobile terminal 100, contact data, phonebook data, messages, audio, still pictures, moving pictures, etc. A recent use history or a cumulative use frequency of each data (e.g., use frequency for each phonebook, each message or each multimedia) can be stored in the memory 160. Data for various patterns of vibration and/or sound outputted in case of a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), and/or other similar memory or data storage device. The mobile terminal 100 may operate in association with a web storage for performing a storage function of the memory 160 on the Internet.

The interface unit 170 may couple the mobile terminal 100 with external devices. The interface unit 170 may receive data from the external devices or may be supplied with the power and then transfer the data or power to the respective elements of the mobile terminal 100 or enable data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the mobile terminal 100 and can include a User Identify Module (UIM), a Subscriber Identify Module (SIM), a Universal Subscriber Identity Module (USIM) and/or the like. A device having the identity module (hereafter called an identity device) can be manufactured as a smart card. Therefore, the identity device may be connectible to the mobile terminal 100 via the corresponding port.

When the mobile terminal 110 is connected to an external cradle, the interface unit 170 may become a passage for supplying the mobile terminal 100 with power from the cradle or a passage for delivering various command signals inputted from the cradle by a user to the mobile terminal 100. Each of the command signals inputted from the cradle or the power may operate as a signal enabling the mobile terminal 100 to recognize that it is correctly loaded in the cradle.

The controller 180 may control overall operations of the mobile terminal 100. For example, the controller 180 may perform the control and processing associated with voice calls, data communications, instant message communication, video calls, camera operations, recording operations, etc. The controller 180 may include a multimedia module 181 that provides multimedia playback. The multimedia module 181 may be part of the controller 180, or may be implemented as a separate component.

The controller 180 may perform a pattern recognizing process for recognizing a writing input and a picture drawing input on the touchscreen as characters or images, respectively.

The power supply 190 may provide power required by the various components for the mobile terminal 100. The power may be internal power, external power, and/or a combination thereof.

Arrangements and embodiments may be implemented in a computer-readable medium using, for example, computer software, hardware, and/or some combination thereof. For a hardware implementation, arrangements and embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Arrangements and embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or a processor, such as the controller 180.

Figure 2A:
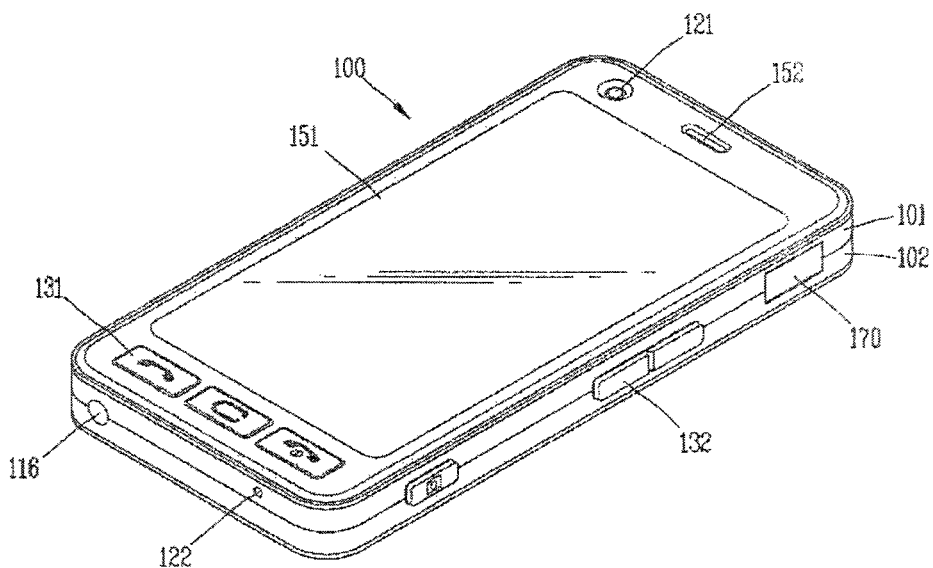
FIG. 2A is a front perspective diagram of a mobile terminal according to an example embodiment.

FIG. 2A is a front perspective diagram of a mobile terminal according to an example embodiment. Other arrangements and embodiments may also be provided.

The mobile terminal 100 shown in FIG. 2A may have a bar type terminal body. The mobile terminal 100 may be implemented in a variety of different configurations. Example configurations may include a folder-type, a slide-type, a rotational-type, a swing-type and/or combinations thereof. For ease of discussion, the following disclosure may primarily discuss a bar-type mobile terminal. However, the teachings apply to other types of mobile terminals.

FIG. 2A shows that the mobile terminal 100 includes a case (casing, housing, cover, etc.) configuring an exterior thereof. The case may include a front case 101 and a rear case 102. Various electric/electronic parts may be provided in a space between the front case 101 and the rear case 102. A middle case may also be provided between the front case 101 and the rear case 102.

The front and rear cases 101 and 102 may be formed by injection molding of synthetic resin or can be formed of a metal substance, such as stainless steel (STS), titanium (Ti) or the like, for example.

The display 151, the audio output unit 152, the camera 121, user input units 130 (including manipulation units 131 and 132), the microphone 122, the interface unit 170 and the like can be provided on the terminal body, and more particularly on the front case 101.

The display 151 may occupy most of a main face of the front case 101. The audio output unit 152 and the camera 121 may be provided at an area adjacent to one of both end portions of the display 151, while the user input unit 130 (such as manipulating unit 131) and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the terminal 100. The input unit 130 may include a first manipulating unit 131 and a second manipulating unit 132. The manipulating units 131 and 132 may be called a manipulating portion and may adopt any mechanism of a tactile manner that enables a user to perform a manipulation action by experiencing a tactile feeling.

Content inputted by the first or second manipulating units 131 or 132 may be diversely set. For example, a command such as start, end, scroll and the like may be inputted using the first manipulating unit 131. A command for a volume adjustment of sound outputted from the audio output unit 152, a command for a switching to a touch recognizing mode of the display 151 or the like can be inputted to the second manipulating unit 132.

Figure 2B:
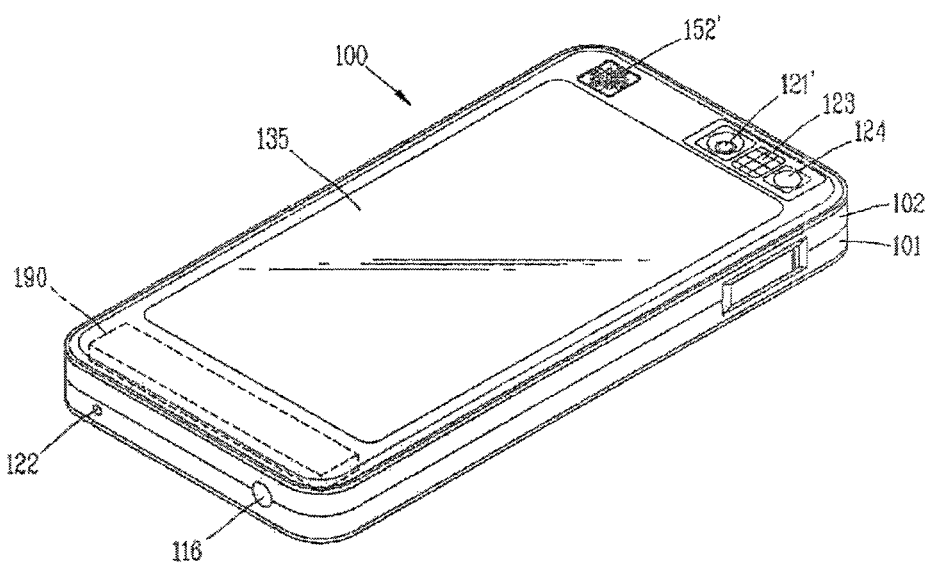
FIG. 2B is a rear perspective diagram of a mobile terminal according to an example embodiment.

FIG. 2B is a perspective diagram of a backside of the terminal shown in FIG. 2A. Other arrangements and embodiments may also be provided.

FIG. 2B shows that a camera 121' may be additionally provided on a backside of the terminal body, and more particularly on the rear case 102. The camera 121' may have a photographing direction that is substantially opposite to the camera 121 shown in FIG. 2A and may have pixels differing from those of the camera 121.

The camera 121 may have low pixels to capture and transmit a picture of a user's face for a video call, while the camera 121' may have high pixels for capturing a general subject for photography without transmitting the captured subject. Each of the cameras 121 and 121' may be installed at the terminal body to be rotated or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view the user's face reflected by the mirror 124.

An additional audio output unit 152' may be provided on the backside of the terminal body. The additional audio output unit 152' may implement a stereo function together with the former audio output unit 152 (shown in FIG. 2A) and may be used for implementing a speakerphone mode in talking over the terminal.

A broadcast signal receiving antenna may be additionally provided on the lateral side of the terminal body as well as an antenna for communication or the like. The antenna may be a portion of the broadcast receiving module 111 (FIG. 1) and can be retractably provided in the terminal body.

The power supply 190 for supplying a power to the terminal 100 may be provided on the terminal body. The power supply 190 may be built within the terminal body. Alternatively, the power supply 190 may be detachably connected to the terminal body.

A touchpad 135 for detecting a touch can be additionally provided on the rear case 102. The touchpad 135 may be a light transmittive type such as the display 151. If the display 151 is configured to output visual information from both faces, the visual information may be recognized via the touchpad 135. The information outputted from both of the faces may be entirely controlled by the touchpad 135. A display may be further provided to the touchpad 135 so that a touchscreen can also be provided to the rear case 102.

The touchpad 135 may be activated by interconnecting with the display 151 of the front case 101. The touchpad 135 can be provided in rear and in parallel to the display 151. The touchpad 135 may have a size equal to or smaller than a size of the display 151.

An interconnected operational mechanism between the display 151 and the touchpad 135 may be explained with reference to FIG. 3A and FIG. 3B.

Figure 3A:
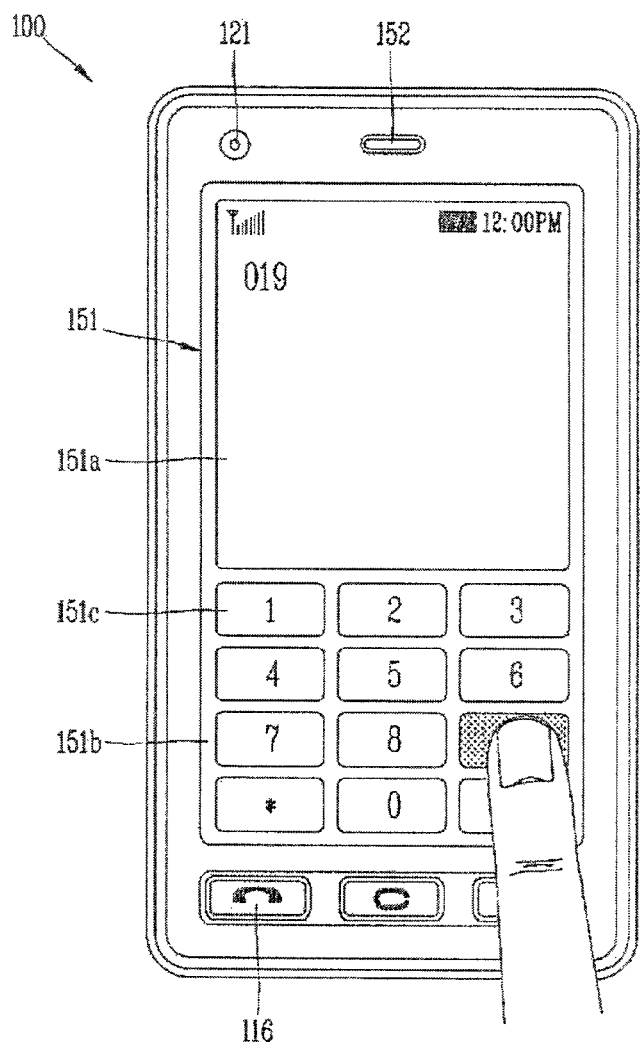
FIG. 3A and FIG. 3B are front diagrams of a mobile terminal according to an example embodiment for explaining an operational status of the mobile terminal.
Figure 3B:
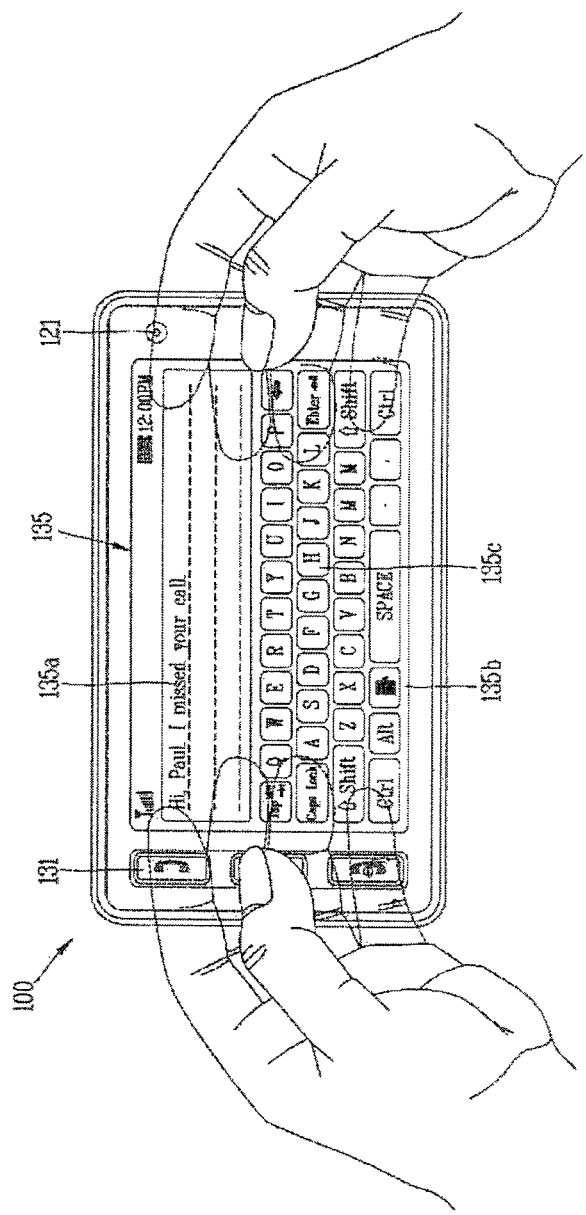

FIG. 3A and FIG. 3B are front-view diagrams of a terminal according to example embodiments for explaining an operational state thereof. Other embodiments and configurations may also be provided.

Various kinds of visual information can be displayed on the display 151. The information can be displayed as characters, numerals, symbols, graphics, icons and/or the like.

In order to input the information, at least one of the characters, the numerals, the symbols, the graphics and the icons may be represented as a single predetermined array to be implemented in a keypad formation. This keypad formation may be considered as soft keys.

FIG. 3A shows that a touch applied to a soft key may be inputted through a front face of a terminal body.

The display 151 is operable over an entire area or by being divided into a plurality of regions. The plurality of regions may be configured interoperable.

For example, an output window 151a and an input window 151b may be displayed on the display 151. A soft key 151c (or a plurality of soft keys) representing a digit for inputting a phone number or the like may be outputted to the input window 151b. If the soft key 151c is touched, a digit corresponding to the touched soft key may be outputted to the output window 151a. If the first manipulating unit 131 is manipulated, a call connection may be attempted for the phone number displayed on the output window 151a.

FIG. 3B shows that a touch applied to a soft key may be inputted through a rear face of a terminal body. FIG. 3A shows a situation in which the terminal body is vertically arranged (portrait) and FIG. 3B shows a situation in which the terminal body is horizontally arranged (landscape). The display 151 can change an output picture according to the arranged direction of the terminal body.

FIG. 3B shows that a text input mode may be activated in the terminal.

An output window 135a and an input window 135b may be displayed on the display 151. A plurality of soft keys 135c representing at least one of characters, symbols and digits can be arranged in the input window 135b. The soft keys 135c can be arranged in a QWERTY key formation.

If the soft keys 135c are touched through the touchpad (i.e., the touchpad 135 in FIG. 2B), the characters, symbols and digits corresponding to the touched soft keys are outputted to the output window 135a. The touch input via the touchpad 135 may be advantageous in that the soft keys 1351c can be prevented from being blocked by a finger in case of touch, which is compared to the touch input via the display 151. In case that the display 151 and the touchpad 135 are transparent, fingers located at the backside of the terminal body may be visually checked. Hence, more correct touch inputs are possible.

The display 151 or the touchpad 135 can be configured to receive a touch input by scroll. A user may scroll the display 151 or the touchpad 135 to shift a cursor or pointer located at an entity (e.g., icon or the like) displayed on the display 151. If a finger is shifted on the display 151 or the touchpad 135, a path of the shifted finger can be visually displayed on the display 151. This may be useful in editing an image displayed on the display 151.

When both the display 151 (or touchscreen) and the touchpad 135 are touched together within a predetermined time range, one function of the terminal can be executed. A simultaneous touch may occur when the terminal body is held by a user using a thumb and a first finger (clamping). The above function can include activation or deactivation for the display 151 or the touchpad 135.

Figure 4:
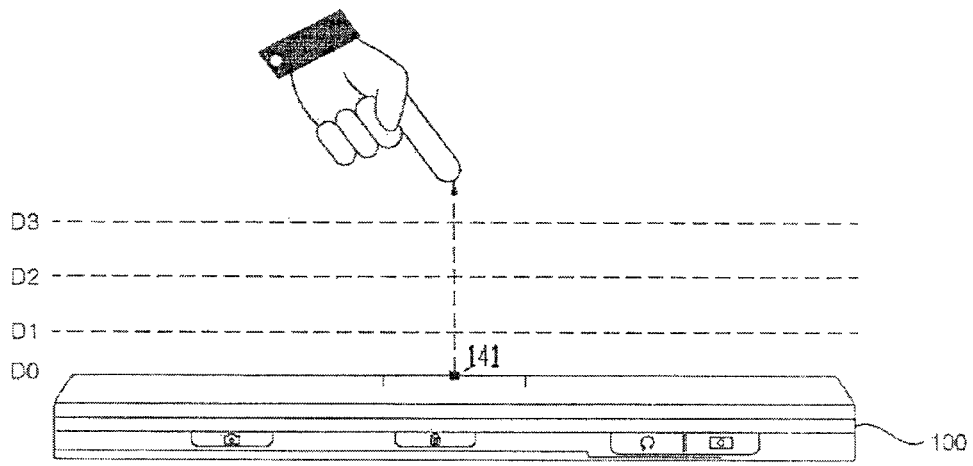
FIG. 4 is a diagram to explain proximity depth of a proximity sensor.

FIG. 4 is a diagram for explaining a proximity depth of a proximity sensor.

As shown in FIG. 4, when a pointer such as a user's finger, a pen and the like approaches the touchscreen, the proximity sensor 141 provided within or in the vicinity of the touchscreen may detect the approach of the pointer and then output a proximity signal.

The proximity sensor 141 may output a different proximity signal according to a distance between the pointer and the proximity-touched touchscreen (hereafter called a proximity depth).

FIG. 4 shows a cross-section of the touchscreen provided with a proximity sensor capable of three proximity depths, namely D1, D2 and D3. The proximity sensor 141 may be capable of proximity depths less than 3 or equal to or greater than 4.

If the pointer fully contacts the touchscreen (D0), the touch is recognized as a contact touch. If the pointer is spaced from the touchscreen by a distance smaller than D1, it is recognized as a proximity touch to a first proximity depth D1. If the pointer is spaced from the touchscreen by a distance between D1 and D2, it is recognized as a proximity touch to a second proximity depth D2. If the pointer is spaced from the touchscreen by a distance smaller than D3 or equal to or greater than D2, it is recognized as a proximity touch to a third proximity depth D3. If the pointer is spaced from the touchscreen by a distance equal to or greater than D3, it is recognized as a proximity touch.

The controller 180 may recognize the proximity touch as one of various input signals according to the proximity depth and position of the pointer. The controller 180 may perform various operation controls according to various input signals.

Figure 5A:
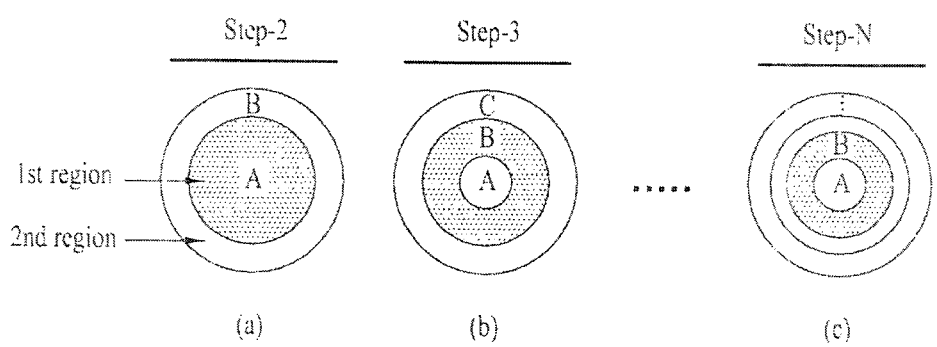
FIG. 5A and FIG. 5B are diagrams to describe a proximity touch recognizing area for detecting a proximity signal and a haptic area for generating a tactile effect, respectively.
Figure 5B:
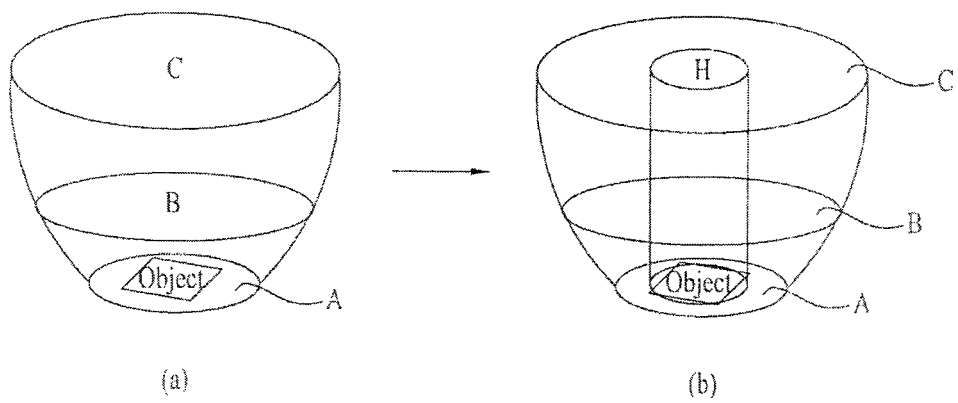

FIG. 5A and FIG. 5B are diagrams to describe a proximity touch recognition area and a tactile effect generation region.

FIG. 5A represents an object such as an icon, a menu item and the like in a circle type for clarity and ease of explanation.

A region for displaying an object on the display 151, as shown in (a) of FIG. 5A, can be divided into a first region A at a central part and a second region B enclosing the first region A. The first region A and the second region B may generate tactile effects differing from each other in strength or in pattern. For example, the first and second regions A, B can be configured to generate 2-step vibrations by outputting a first vibration when the second region B is touched and by outputting a second vibration greater than the first vibration when the first region A is touched.

If the proximity touch recognition region and the haptic region are simultaneously set in the region having the object displayed therein, the haptic region for generating the tactile effect may be set differently from the proximity touch recognition region for detecting the proximity signal. The haptic region may be narrower or wider than the proximity touch recognition region. For example, in (a) of FIG. 5A, the proximity touch recognition region may be set to the area including both the first region A and the second region B. The haptic region may also be set to the first region A.

The region having the object displayed therein may be discriminated into three regions A, B and C as shown in (b) of FIG. 5A. Alternatively, the region having the object displayed therein may be discriminated into N regions (N>4) as shown in (c) of FIG. 5A. Each of the divided regions may be configured to generate a tactile effect having a different strength or pattern. If a region having a single object represented therein is divided into at least three regions, the haptic region and the proximity touch recognition region may be set to differ from each other according to a use environment.

A size of the proximity touch recognition region of the display 151 may vary according to a proximity depth. Referring to (a) of FIG. 5B, the proximity touch recognition region may decrease by C→B→A according to the proximity depth for the display 151. The proximity touch recognition region may also increase by C→B→A according to the proximity depth for the display 151. Despite the above configuration, the haptic region may be set to have a predetermined size, as the region 'H' shown in (b) of FIG. 5B, regardless of the proximity depth for the display 151.

In dividing the object-displayed region for setting of the haptic region or the proximity touch recognition region, various schemes of horizontal/vertical division, radial division and combinations thereof as well as the concentric circle type division shown in FIG. 5A may be used.

A configuration of the above-described projector module provided in the bar type mobile terminal 100 may now be explained in detail with reference to FIG. 6A and FIG. 6B.

Figure 6A:
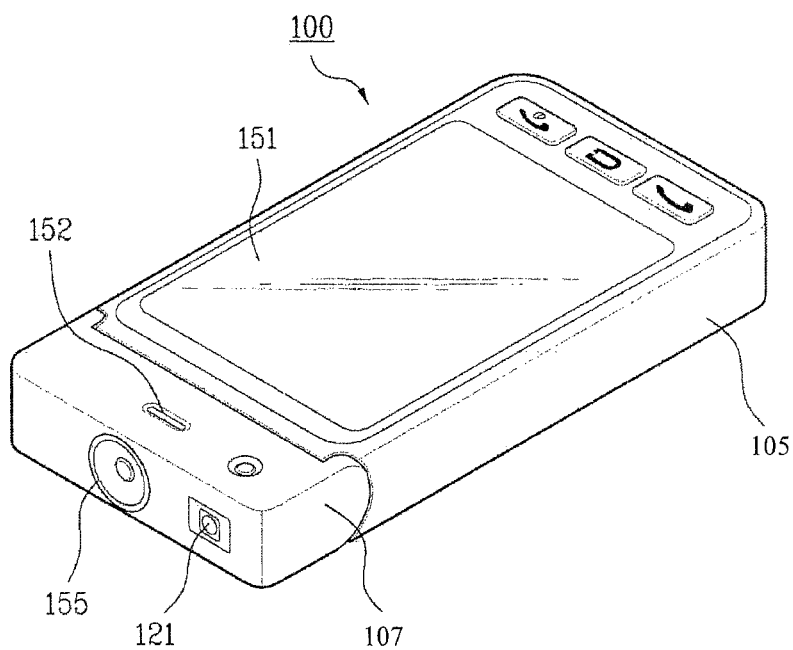
FIG. 6A and FIG. 6B are perspective diagrams of a mobile terminal according to an example embodiment.
Figure 6B:
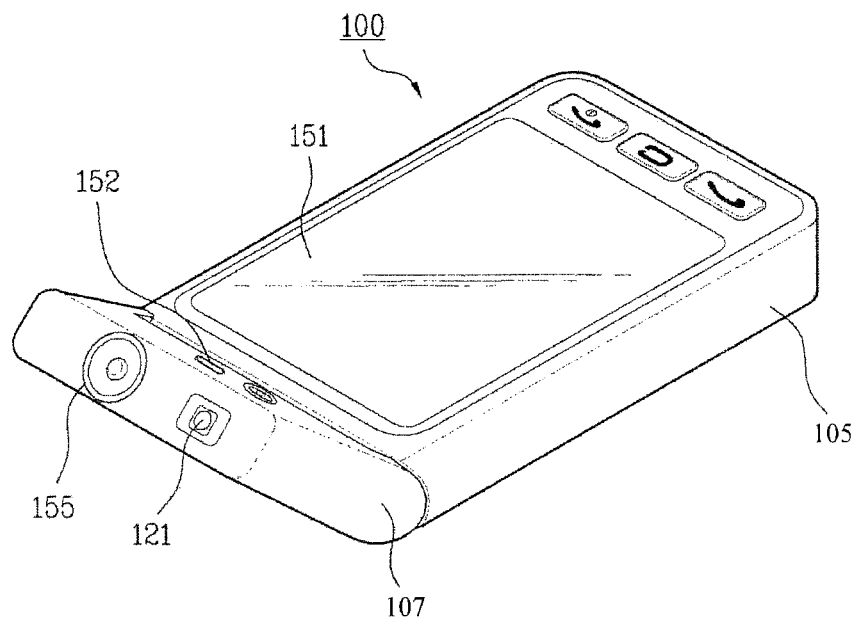

FIG. 6A and FIG. 6B are perspective diagrams of a mobile terminal according to an example embodiment. Other embodiments and arrangements may also be provided.

FIG. 6A shows a projector body 107 having the projector module 155 that may be rotatably coupled to a main body 105 of the mobile terminal 100.

The projector body 107 may be hinged to the main body 105. A projected angle of an image that is projected using the projector module 155 provided on the projector body 107 may be controlled. The camera 121 may be provided on the projector body 107 to photograph the image projected by the projector module 155.

FIG. 6A shows a status before rotation of the projector body 107 relative to the main body 105. FIG. 6B shows a status after rotation of the projector body 107.

Embodiments may be more easily implemented if the display module 151 includes a touchscreen. Embodiments may also be implemented by manipulations of the user input unit 130 if the display module 151 does not include the touchscreen.

A display screen of the touchscreen 151 may be referred to by a reference number '400'.

First Embodiment

A method of controlling a mobile terminal according to a first embodiment of the present invention may be explained with reference to FIGS. 7 to 10.

Figure 7:
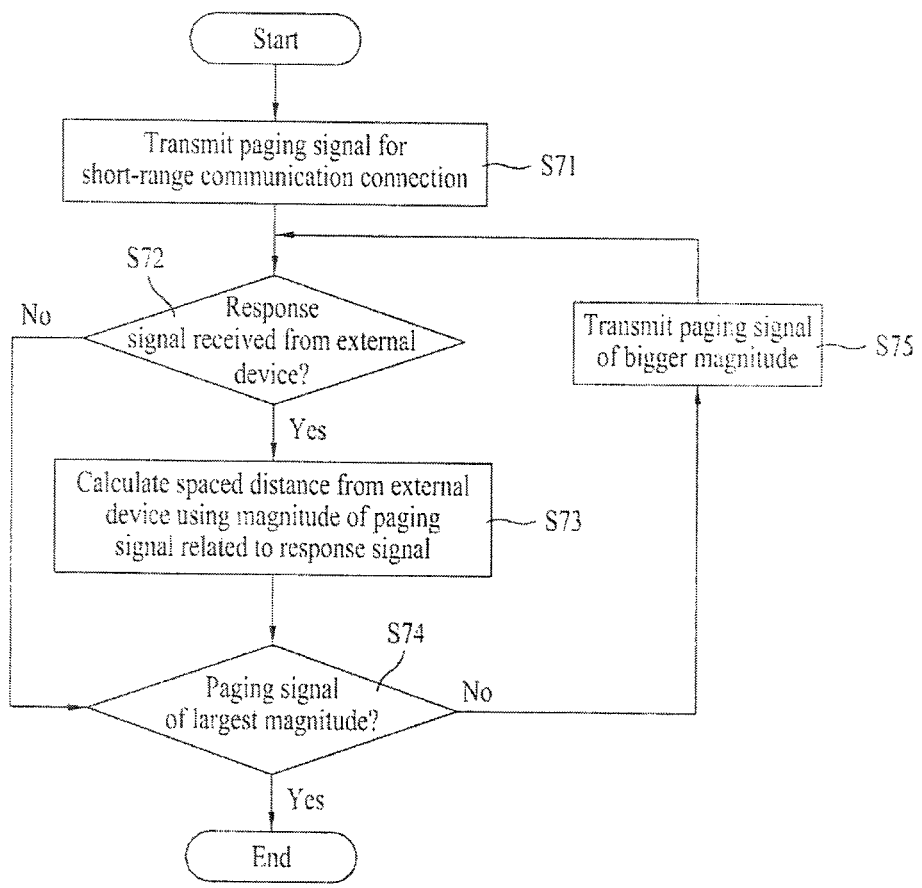
FIG. 7 is a flowchart of a method of controlling a mobile terminal according to a first embodiment of the present invention.
Figure 8:
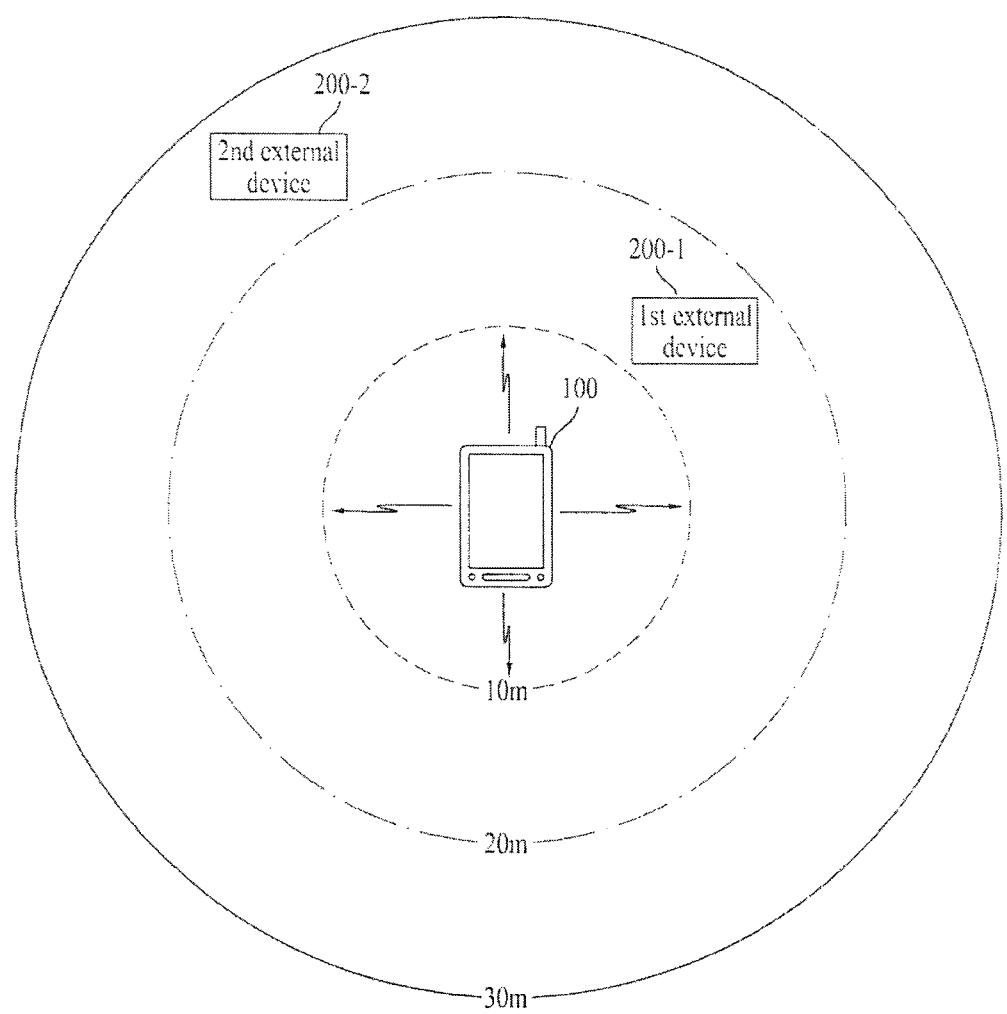
FIGS. 8 to 10 are diagrams of a mobile terminal and at least one external device for performing the controlling method shown in FIG. 7.
Figure 9:
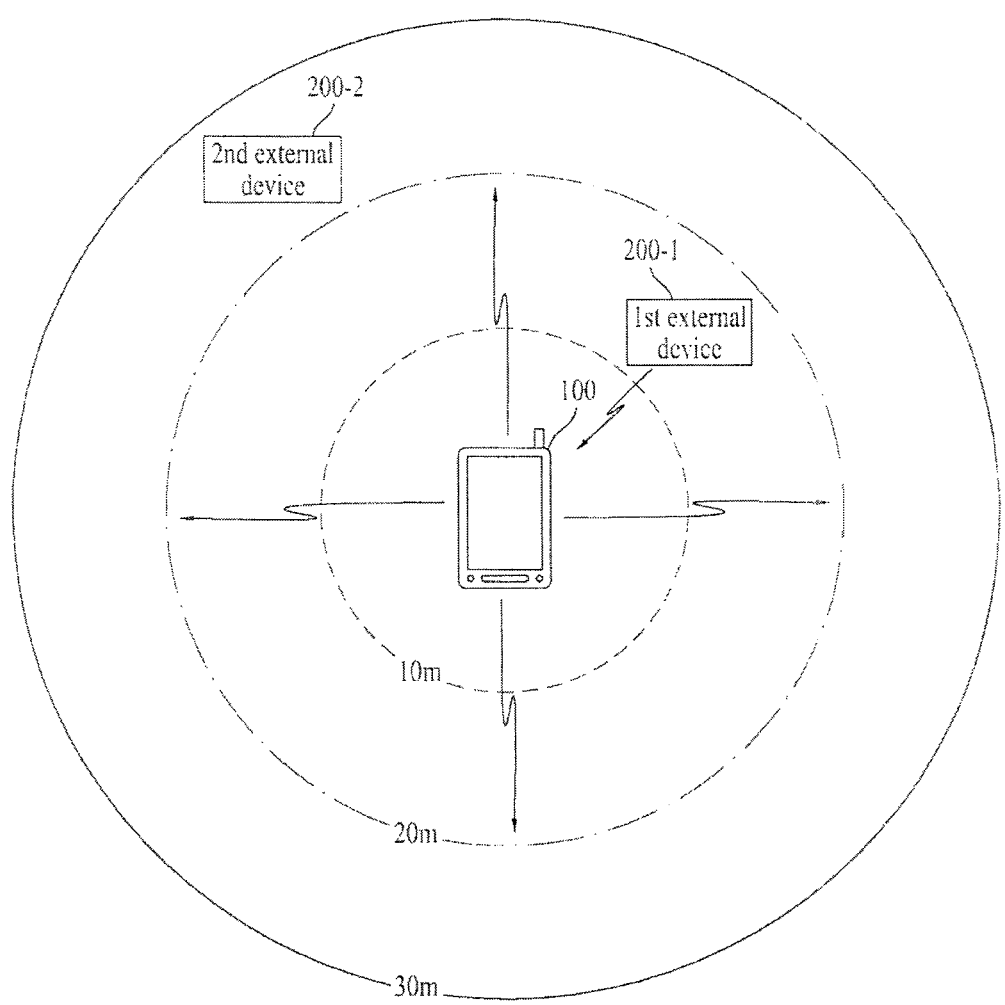
Figure 10:
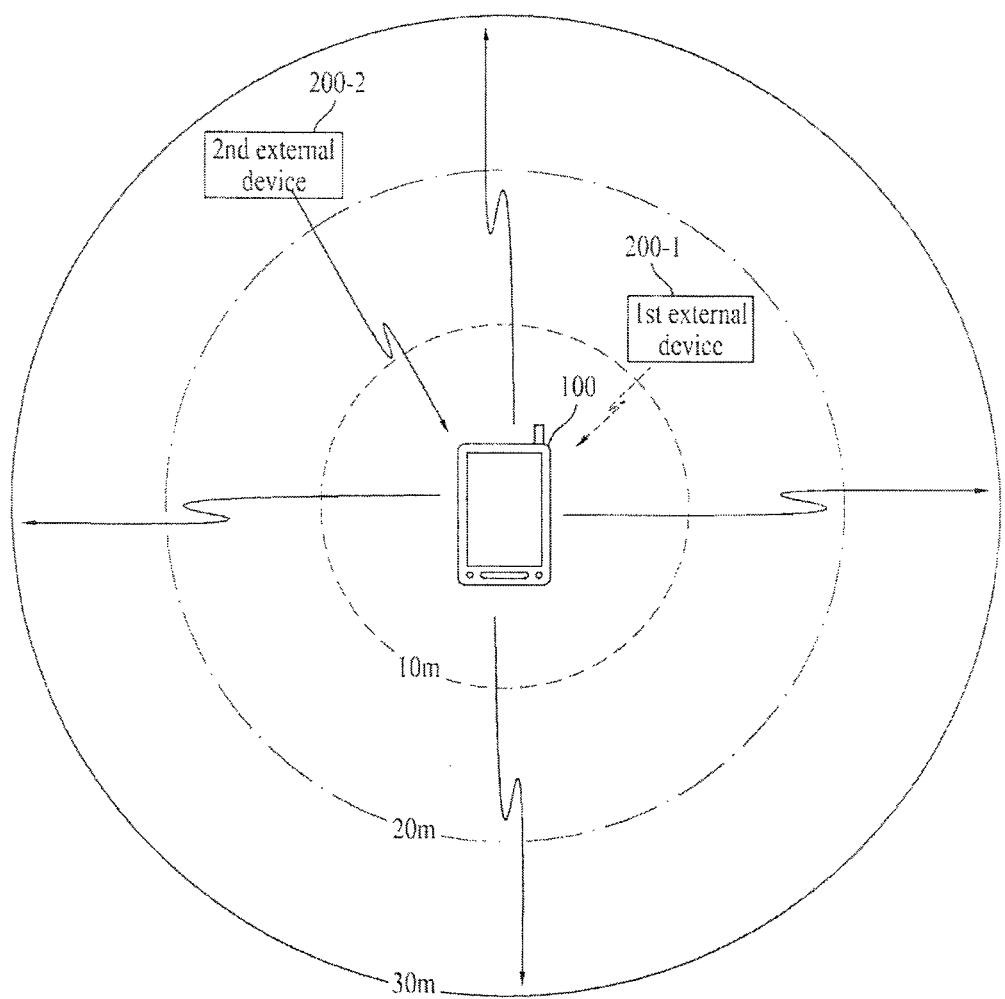

FIG. 7 is a flowchart of a method of controlling a mobile terminal according to a first embodiment of the present invention. FIGS. 8 to 10 are diagrams of a mobile terminal and at least one external device for performing the controlling method shown in FIG. 7. Other embodiments and configurations are also within the scope of the present invention.

The mobile terminal 100 may be connected to at least one external device via a short-range communication (e.g., Bluetooth). The external device may be a headset, another mobile terminal, a printer and/or the like, which is capable of the short-range communication.

When the mobile terminal 100 is connected to the external device, a spaced distance from the external device may be recognized.

As shown in FIG. 8, the mobile terminal 100 may externally transmit, via the wireless communication unit 110, a paging signal (e.g., a beacon signal) having a first signal magnitude for searching for peripheral external devices. The paging signal may be transmitted via the short-range communication module 114 to search for an unspecific external device capable of the short-range communication. As one example, FIG. 7 shows operation S71 that includes transmitting paging signals for a short-range communication connection.

It is assumed that the paging signal having the first signal magnitude is able to arrive at a place away from the mobile terminal 100 by a first distance (e.g., 10 m). The first distance may not be a predetermined distance that is absolutely unchangeable. This is because a distance reachable by the paging signal of the first signal magnitude may be variable according to an environment in which the mobile terminal 100 is located. The first distance may be variable according to surroundings of the mobile terminal 100.

In FIG. 8, no external device capable of the short-range communication exists within the first distance from the mobile terminal 100. The mobile terminal 100 may therefore be unable to receive a response signal from any external device. Accordingly, the mobile terminal 100 may recognize that no external device capable of the short-range communication is provided within the first distance. For example, operation S72 of FIG. 7 includes determining whether a response signal is received from an external device.

As shown in FIG. 9, the mobile terminal 100 may externally release, via the wireless communication unit 110, a paging signal having a second signal magnitude for searching for peripheral external devices.

The second signal magnitude may be greater than the first signal magnitude. The latter paging signal of the second signal magnitude may reach a second distance (e.g., 20 m) farther than the first distance from the mobile terminal 100. The second distance may be variable.

As shown in FIG. 9, a first external device 200-1 may exist within the second distance from the mobile terminal 100. The first external device 200-1 may receive the paging signal of the second signal magnitude and may then send a first response signal to the mobile terminal 100 in response to the received paging signal.

The first response signal can include information on at least one of an address of the first external device, a name of the first external device, a clock of the first external device, a support service (support function) of the first external device, a support RF type of the first external device, information and/or magnitude of the received paging signal, a magnitude of the first response signal and the like.

The mobile terminal 100 may receive the first response signal from the first external device 200-1. This may correspond to an affirmative determination in operation S72 of FIG. 7. The first external device 200-1 may be searched by the mobile terminal 100.

As the mobile terminal 100 receives the first response signal from the first external device 200-1 after transmission of the paging signal of the second signal magnitude, the mobile terminal 100 may recognize that the first external device 200-1 is located between the first distance and the second distance from the mobile terminal 100 without interpreting the information (i.e., signal magnitude information of the received paging signal) included in the first response signal. For example, in operation S73 of FIG. 7, a spaced distance may be calculated from the external device using a magnitude of the paging signal related to the response signal.

For example, if the mobile terminal 100 transmits the paging signal of the first signal magnitude and the paging signal of the second signal magnitude in a time interval that is too short, it may be unclear that the first response signal is a response to which one of the paging signal of the first signal magnitude and the paging signal of the second signal magnitude. The mobile terminal 100 may interpret the information (i.e., information of the received paging signal) included in the first response signal to further clarify that the first response signal is the response to either the paging signal of the first signal magnitude or the paging signal of the second signal magnitude.

The paging signal of the second signal magnitude may be unable to reach a second external device 200-2 located outside a second distance from the mobile terminal 100. Accordingly, the mobile terminal 100 may be unable to search for the second external device 200-2 using the paging signal of the second signal magnitude.

Subsequently, as shown in FIG. 10, the mobile terminal 100 may release a paging signal of a third signal magnitude via the wireless communication unit 110 to search for peripheral external devices. In this case, the paging signal of the third signal magnitude may be a paging signal having a maximum magnitude that can be released by the mobile terminal 100. For example, operation S74 of FIG. 7 includes determining that a paging signal is of a largest magnitude. If the paging signal is not the largest magnitude, then operation S75 includes transmitting a paging signal of larger magnitude.

The third signal magnitude may be greater than the second signal magnitude. Therefore, the paging signal of the third signal magnitude may reach a third distance (i.e., a maximum distance) (e.g., 30 m) farther than the second distance from the mobile terminal 100. The third distance may be variable according to surroundings of the mobile terminal 100.

As shown in FIG. 10, the first external device 200-1 and the second external device 200-2 may exist within a range of the third distance from the mobile terminal 100. Therefore, the second external device 200-2 may receive the paging signal of the third signal magnitude and may then send a second response signal to the mobile terminal 100 in response to the received paging signal of the third signal magnitude.

The first external device 200-1 may transmit the first response signal in response to the paging signal of the second signal magnitude again. Alternatively, since the first external device 200-1 has already transmitted the first response signal in response to the paging signal of the second signal magnitude, the first external device 200-1 may not transmit a response signal in response to the paging signal of the third signal magnitude.

The second response signal may include information on at least one of an address of the second external device 200-2, a name of the second external device 200-2, a clock of the second external device 200-2, a support service (support function) of the second external device 200-2, a support RF type of the second external device 200-2, a magnitude of the received paging signal, a magnitude of the second response signal and/or the like.

The mobile terminal 100 may receive the second response signal from the second external device 200-2. Thus, the second external device 200-2 may be recognized by the mobile terminal 100. This may correspond to an affirmative response in operation S72 of FIG. 7.

As the mobile terminal 100 receives the second response signal from the second external device 200-2 after transmission of the paging signal of the third signal magnitude, the mobile terminal 100 may recognize that the second external device 200-2 is located between the second distance and the third distance from the mobile terminal 100 without interpreting the information (i.e., information of the received paging signal) included in the second response signal. This may correspond to calculating (or determining) the spaced distance in operation S73 of FIG. 7.

For example, if the mobile terminal 100 transmits the paging signal of the third signal magnitude and a paging signal of a different signal magnitude in a time interval that is too short, it may be unclear that the second response signal is a response to which one of the paging signal of the third signal magnitude and the paging signal of the different signal magnitude. The mobile terminal 100 may interpret the information (i.e., information of the received paging signal) included in the second response signal to further clarify that the second response signal is the response to the paging signal of the third signal magnitude.

In searching for an external device capable of short-range communication, the mobile terminal 100 may recognize a distance spaced apart from the searched external device by the above-described method.

In the following description, FIGS. 11-14 may be used to explain displaying the searched external device on the display 151 of the mobile terminal 100.

FIGS. 11 to 14 are diagrams of a display screen of a mobile terminal according to the first embodiment of the present invention.

Figure 11:
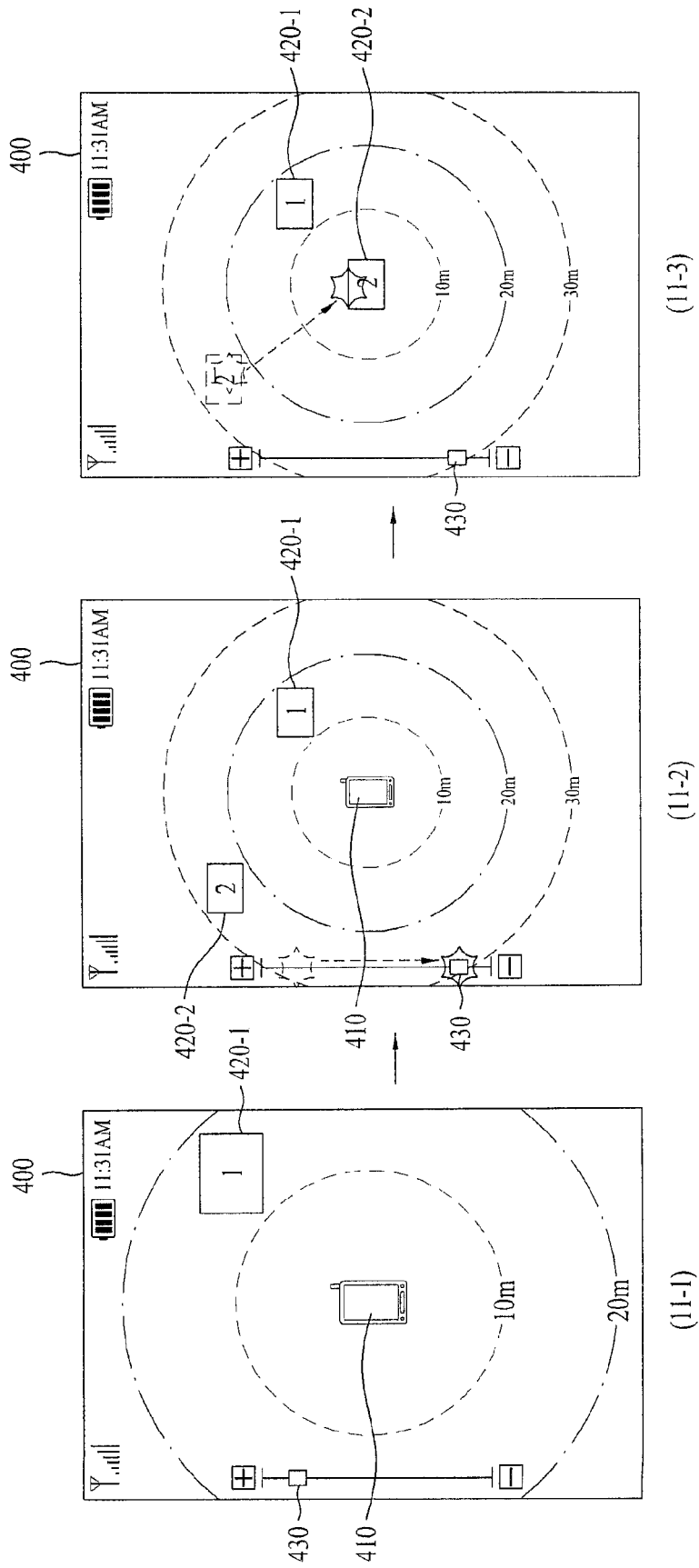
FIGS. 11 to 14 are diagrams of a display screen of a mobile terminal according to the first embodiment.

Referring to (11-1) of FIG. 11, both a present terminal icon 410 representing the mobile terminal 100 and a first external device icon 420-1 representing the first external device 200-1 may be displayed on a touchscreen 400 of the mobile terminal 100.

The present terminal icon 410 may be displayed on the touchscreen 400 in a central part of the touchscreen 400. The first external device icon 420-1 may be displayed on the touchscreen 400 and may be spaced from the present terminal icon 410 within a range between a first distance and a second distance. Therefore, a terminal user may easily recognize that the first external device 200-1 is spaced from the mobile terminal 100 within the range between the first distance and the second distance. The displayed distances or ranges of the icons may correspond to distances or ranges of the actual external devices.

The present terminal icon 410 may not necessarily be arranged or displayed at the central part of the touchscreen 400. The present terminal icon 400 may be arranged or displayed at an edge part of the touchscreen 400, while the first external device icon 420 is spaced from the present terminal icon 410 within the range between the first distance and the second distance (not shown).

A scroll bar 430 may be displayed on the touchscreen 400 for zooming in or out of a display of the touchscreen 400.

The scroll bar 430 may be touched and dragged in one direction.

Referring to (11-2) of FIG. 11, the display of the touchscreen 400 may be zoomed out. The display of the touchscreen 400 may be zoomed in if the scroll bar 430 is touched and dragged in the other direction.

A second external device icon 420-2 representing the second external device 200-2 may be displayed on the touchscreen 400 together with the present terminal icon 410 and the first external device icon 420-1.

The present terminal icon 410 may be arranged at a central part of the touchscreen 400, the first external device icon 420-1 may be arranged on the touchscreen 400 and may be spaced from the present terminal icon 410 within a range between a first distance and a second distance, and the second external device icon 200-2 may be arranged on the touchscreen 400 and may be spaced from the present terminal icon 410 within a range between the second distance and a third distance. Therefore, a terminal user may easily recognize that the second external device 200-2 is spaced from the mobile terminal 100 within the range between the second distance and the third distance.

Referring to (11-3) of FIG. 11, one of the peripheral external devices (e.g., the second external device icon 420-2) may be touched by a pointer (e.g., a finger, a stylus pen, etc.) and then dragged to the present terminal icon 410. The mobile terminal 100 may then be connected to the second external device 200-2 by a short-range communication.

The short-range communication may not be necessarily established between the mobile terminal 100 and the second external device 200 only if the second external device icon 420-2 is touched by the pointer and is then dragged to the present terminal icon 410.

For example, the short-range communication may be established between the mobile terminal 100 and the second external device 200-2 if the present terminal icon 410 is touched (e.g., single touched, double touched and/or long touched) and dragged to the second external device icon 420-2 or the second external icon 420-2 is touched by the pointer only.

If both of the first external device icon 420-1 and the second external device icon 420-2 are touched together or touched and dragged to the present terminal icon 410, the mobile terminal 100 may establish short-range communication connections to the first external device 200-1 and the second external device 200-2 collectively.

Therefore, if the first external device 200-1 and the second external device 200-2 include headsets, then two terminal users may be considered to be provided with audio, which is externally outputted from the mobile terminal 100 via the short-range communication, in such a manner that the audio is received by both the first and second external devices 420-1, 420-2.

Another zoom-in/out method of the display of the touchscreen 400 and another method of selecting the external device may be further explained with reference to FIG. 12. These two methods may not always be implemented together in the mobile terminal 100. These methods may be individually implemented in the mobile terminal 100.

Figure 12:
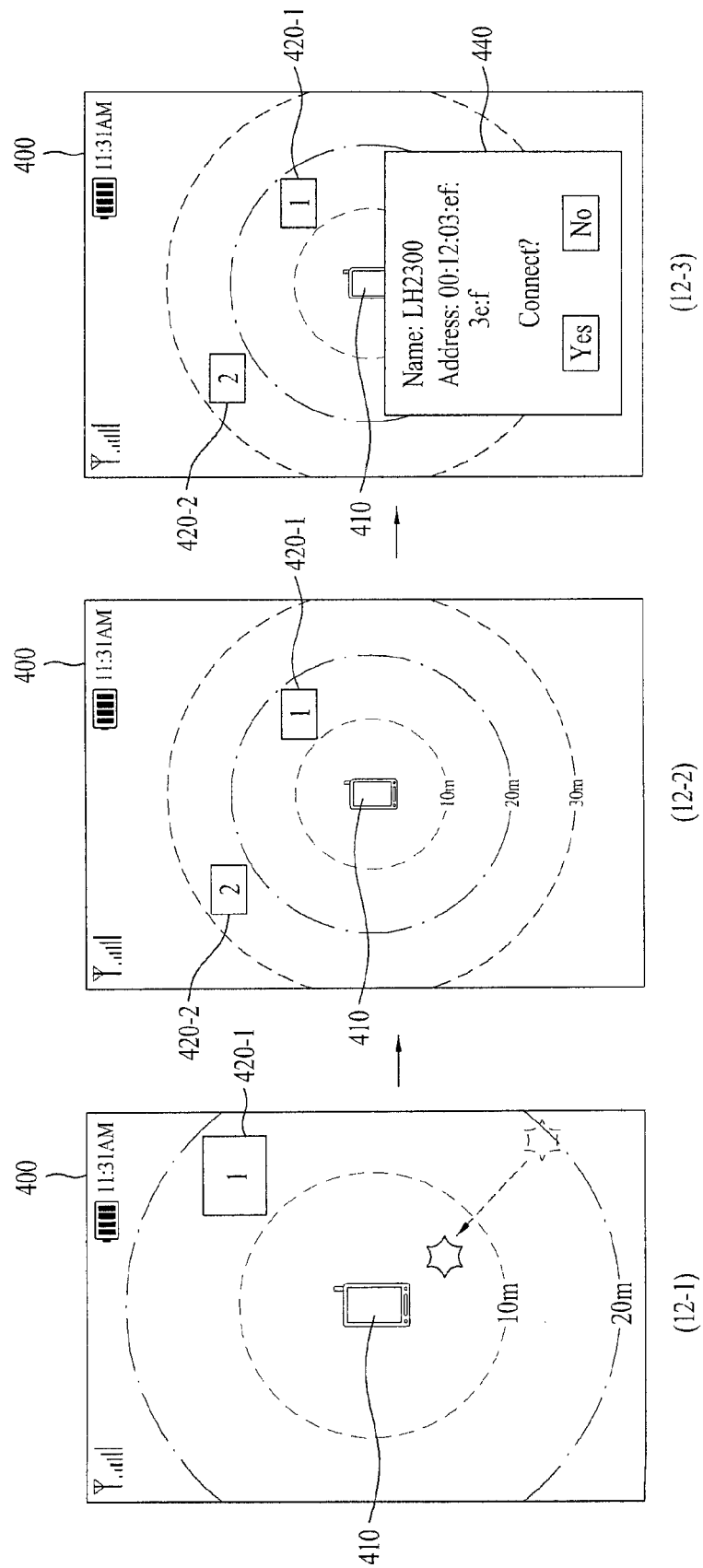

Referring to (12-1) of FIG. 12, both the present terminal icon 410 representing the mobile terminal 100 and the first external device icon 420-1 representing the first external device 200-1 are displayed on a touchscreen 400 of the mobile terminal 100.

The present terminal icon 410 may be displayed on the touchscreen 400 at a central part of the touchscreen 400. The first external device icon 420-1 may be displayed on the touchscreen 400 and may be arranged to be spaced from the present terminal icon 410 within a range between the first distance and the second distance. Therefore, a terminal user may easily recognize that the first external device 200-1 is spaced from the mobile terminal 100 within the range between the first distance and the second distance.

The present terminal icon 410 may not necessarily be arranged or displayed at the central part of the touchscreen 400. The present terminal icon 400 may be arranged at an edge part of the touchscreen 400, while the first external device icon 420 is spaced from the present terminal icon 410 within the range between the first distance and the second distance (not shown).

A random position on the touchscreen 400 may be touched with a pointer and may then be dragged in a first direction toward the present terminal icon 410, for example.

Referring to (12-2) of FIG. 12, a display of the touchscreen 400 may be zoomed out. The first direction for zooming an output of the display of the touchscreen 400 may not always be toward the present terminal icon 410. The first direction may be set to a direction for getting far away from the present terminal icon 410.

If a random position on the touchscreen 400 is touched with a pointer and is then dragged in a second direction opposite to the first direction, then the display of the touchscreen 400 may be zoomed in.

One of the peripheral external devices (e.g., the second external device icon 420-2) may be touched (e.g., simple touched, double touched, long touched, etc.) with a pointer.

Referring to (12-3) of FIG. 12, an information window 440 for the second external device 220-2 may be displayed. In the information window 440, information included in a second response signal received from the second external device 220-2 by the mobile terminal 100 can be at least partially displayed. Therefore, the information window 440 may facilitate a terminal user to check whether the second external device 220-2 is a desired specific device for a short-range communication connection. Subsequently, the terminal user may select whether to establish a short-range communication with the second external device 220-2 through the information window 440.

The mobile terminal 100 may sequentially transmit paging signals of various magnitudes toward an external device. A distance of the external device spaced from the present terminal may be calculated based on a magnitude of the paging signal to which the external device responds.

Embodiments may not necessarily include a plurality of paging signals of various magnitudes to be sequentially transmitted to an external device. For example, if a terminal user inputs a prescribed spaced distance, the mobile terminal 100 may be configured, and more particularly, the controller 180 may externally transmit one paging signal of a prescribed magnitude corresponding to the prescribed spaced distance via the wireless communication unit and may enable an icon of an external device responding to the paging signal to be displayed on the display.

In this example, as a terminal user performs touch & drag on the scroll bar 430 displayed on the touchscreen 400 or performs touch & drag on a prescribed point of the touchscreen 400, the prescribed spaced distance may correspond to a maximum spaced distance that can be represented on the touchscreen 400 when the touchscreen 400 is zoomed in or zoomed out.

If a terminal user changes the prescribed spaced distance (e.g., the maximum spaced distance that can be represented on the touchscreen) by zooming in or out, the mobile terminal 100 may externally transmit one paging signal of a different magnitude corresponding to the changed spaced distance via the wireless communication unit and enable an icon of an external device responding to the paging signal to be displayed on the display 151.

The searched external devices may be displayed on the touchscreen together with qualities of short-range communications with the mobile terminal 100. This may be further explained with reference to FIG. 13.

Figure 13:
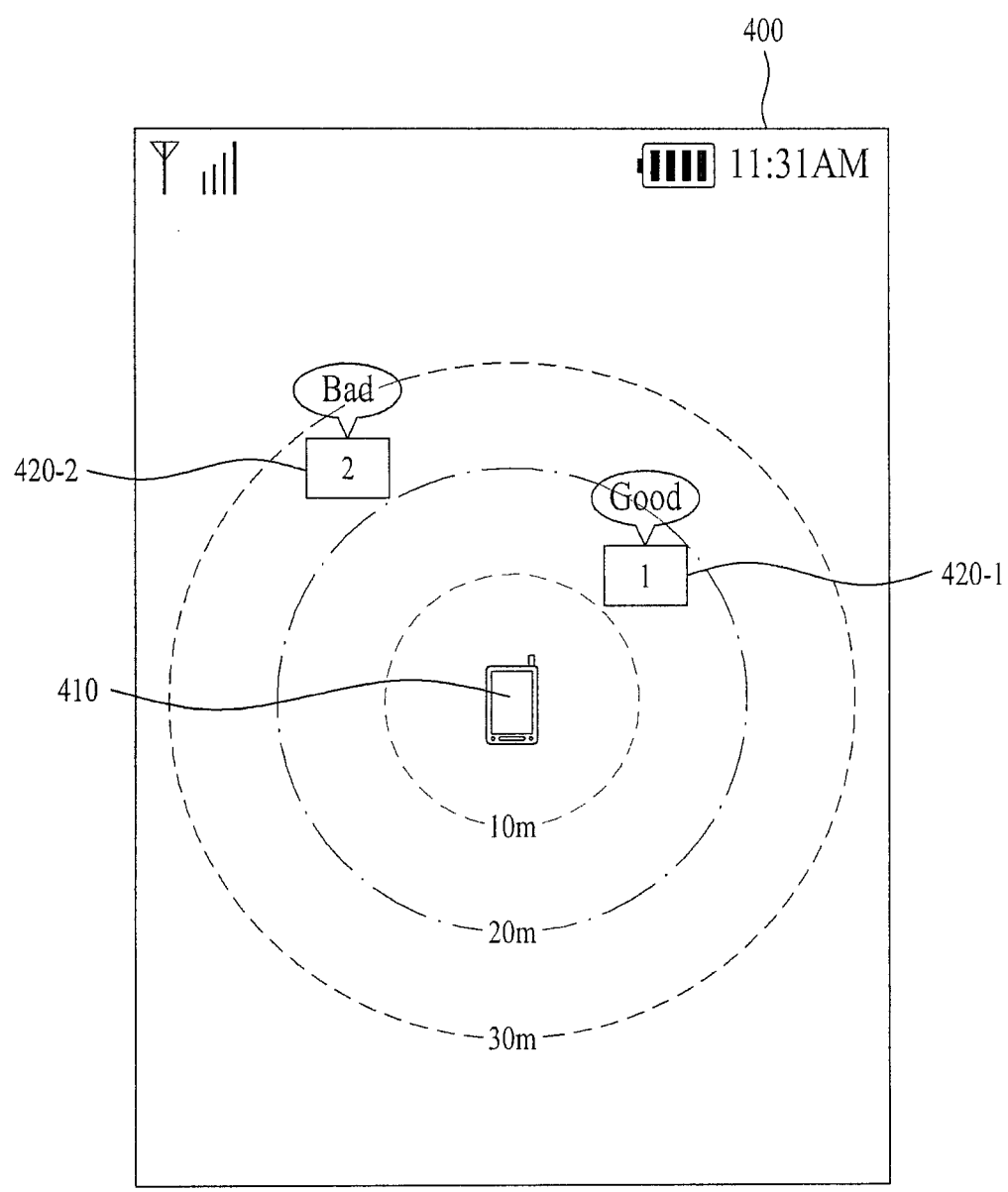

FIG. 13 is described based on an assumption that both a first external device 200-1 and the second external device 200-2 perform a first function (e.g., a Bluetooth headset function) and based on the assumption that a suitable spaced distance between the mobile terminal 100 and the external device for a normal first function through the short-range communication is equal to or less than a second distance.

Referring to FIG. 13, the first external device icon 420-1 may be displayed on the touchscreen 400 to indicate that the first external device 200-1 is spaced apart from the mobile terminal 100 within a range of the second distance. The second external device icon 420-2 may be displayed on the touchscreen 400 to indicate that the second external device 200-2 is spaced apart from the mobile terminal 100 beyond a range of the second distance.

The mobile terminal 100 may recognize that functions supported by the first external device 200-1 and the second external device 200-2 correspond to the first function based on the information included in the first and second response signals received from the first and second external devices 200-1 and 200-2, respectively.

The mobile terminal 100 may store data in the memory 160 that indicates that a generally and suitably spaced distance of an external device for the first function through the short-range communication amounts to a range of the second distance by considering a communication rate necessary for each function. Alternatively, the data can be received by the mobile terminal 100 by being included in the corresponding response signal.

Therefore, the mobile terminal 100 and more particularly the controller 180 may recognize that the first function of the first external device 200-1 can be properly performed through the short-range communication by considering that the spaced distance of the first external device 200-1 lies within the second spaced distance. Accordingly, the mobile terminal 100 may further represent that the first external device 200-1 can work in good status when the first external device icon 420-1 is displayed on the touchscreen 400.

The mobile terminal 100 and more particularly the controller 180 may recognize that the first function of the second external device 200-2 has difficulty in being properly performed through the short-range communication by considering that the spaced distance of the second external device 200-2 is out of the range of the second spaced distance. Accordingly, the mobile terminal 100 may further represent that the second external device 200-2 may work in bad status when the second external device icon 420-2 is displayed on the touchscreen 400.

FIG. 13 relates to the first and second external devices 200-1 and 200-2 supporting a same function (i.e., the first function).

In the following, the first external device 200-1 and a third external device 200-3 (shown in FIG. 16) support a first function (e.g., a headset function) and a second function (e.g., a file sharing function), respectively.

In the following, a suitable spaced distance of an external device from the mobile terminal 100 for a normal first function through the short-range communication may be assumed to be equal to or less than a second distance. A suitable spaced distance of an external device from the mobile terminal 100 for a normal second function through the short-range communication may be assumed to be equal to or less than a first distance.

Figure 14:
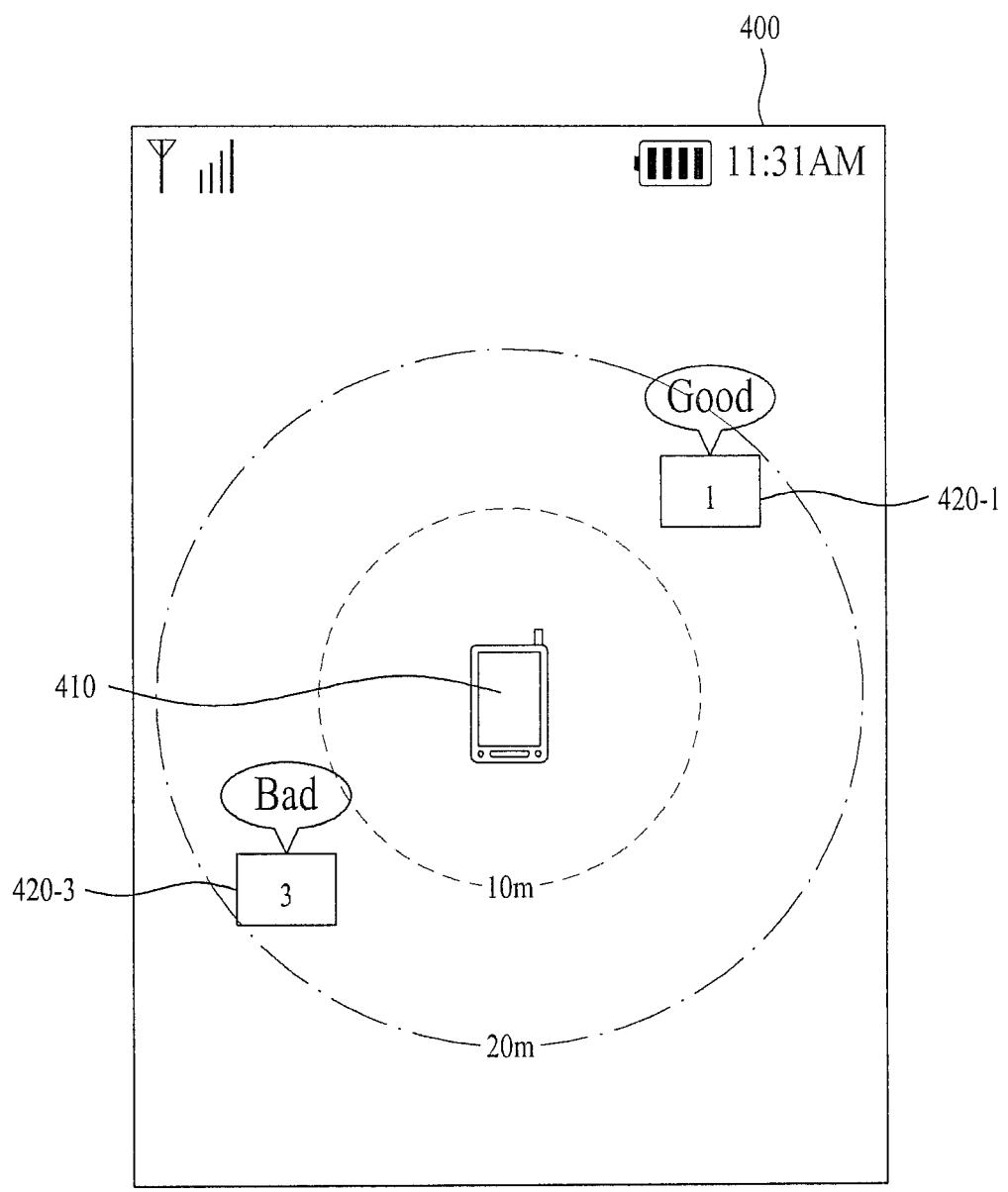

Referring to (14-1) of FIG. 14, the first external device icon 420-1 and a third external device icon 420-3 may be displayed to indicate that the first external device 200-1 and the third external device 200-3 are spaced from the mobile terminal 100 within a range between the first distance and the second distance, respectively.

The mobile terminal 100 may recognize that functions supported by the first external device 200-1 and the third external device 200-3 correspond to the first function and the second function based on the information included in the first and third response signals received from the first and third external devices 200-1 and 200-3, respectively.

The mobile terminal 100 can store data in the memory 160 that indicates that generally and suitably spaced distances of the external devices for the first and third functions through the short-range communications amount to a range within the second distance and a range within the first distance by considering communication rates necessary for the functions, respectively. The data can be received by the mobile terminal 100 by being included in the corresponding response signal.

Therefore, the mobile terminal 100 and more particularly the controller 180 may recognize that the first function of the first external device 200-1 can be properly performed through the short-range communication by considering that the spaced distance of the first external device 200-1 is within the second spaced distance. Accordingly, the mobile terminal 100 may further represent that the first external device 200-1 works in good status when the first external device icon 420-1 is displayed on the touchscreen 400.

The mobile terminal 100 and more particularly the controller 180 may recognize that the second function of the third external device 200-3 has difficulty in being properly performed through the short-range communication by considering that the spaced distance of the third external device 200-3 is out of the range of the first spaced distance. Accordingly, the mobile terminal 100 may further represent that the third external device 200-3 may work in bad status when the third external device icon 420-3 is displayed on the touchscreen 400.

Even if the first and the third external devices 200-1 and 200-3 are within the range of the same spaced distance, the touchscreen 400 may display whether each of the external devices 200-1 and 2003 can work in good status differently according to the function supported by the corresponding external device.

Although a prescribed external device is spaced from the mobile terminal 100 to lie farther than the third external device 200-3, it may display that the prescribed external device can work in good status according to a communication rate attributed to a function (e.g., a remote controller function) supported by the prescribed external device (not shown).

In the above description, information indicating whether an external device works normally in consideration of a spaced distance and support function of the external device may be displayed on the touchscreen 400. Alternatively, the mobile terminal 100 may display that a normal operation of an external device is possible if the external device is spaced within a prescribed spaced distance irrespective of a support function in consideration of a spaced distance of the external device only. It may display that a normal operation of an external device is not possible if the external device is spaced out of a range of a prescribed spaced distance in consideration of a spaced distance of the external device only.

Second Embodiment

When two external devices are located within a range of the same spaced distance (e.g., a range between a first spaced distance and a second spaced distance), one may not recognize which one of the two external devices is located by being spaced farther or closer.

A second embodiment may now be described that facilitates recognizing which one of two external devices is located by being spaced farther or closer even if the two external devices are located within a range of the same spaced distance.

Figure 15:
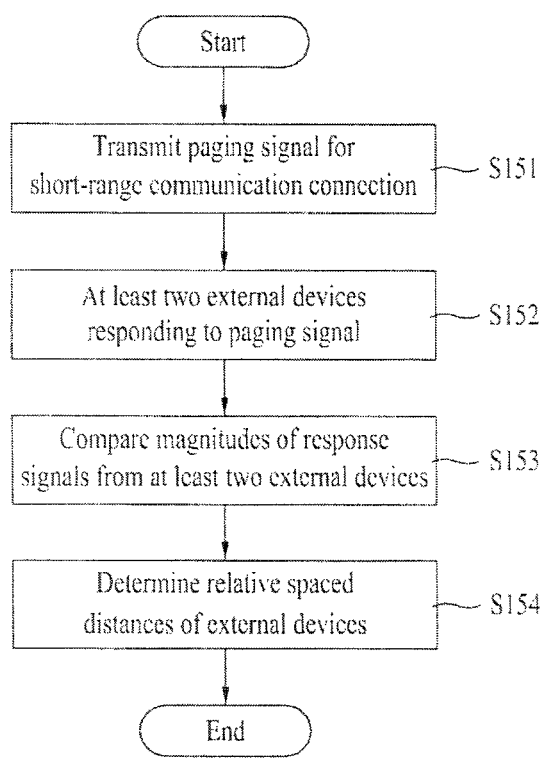
FIG. 15 is a flowchart of a method of controlling a mobile terminal according to a second embodiment of the present invention.
Figure 16:
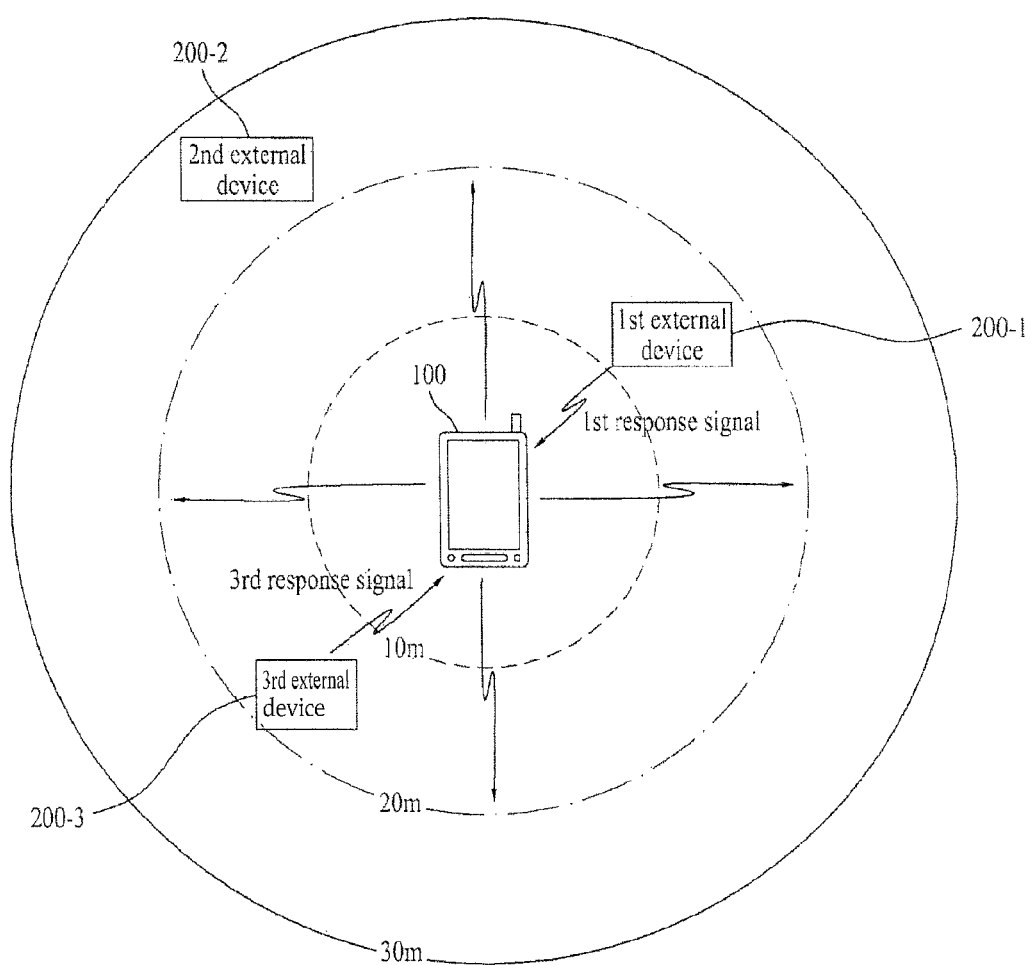
FIG. 16 is a diagram of a mobile terminal and at least one external device for performing the controlling method shown in FIG. 15.

FIG. 15 is a flowchart of a method of controlling a mobile terminal according to a second embodiment of the present invention. FIG. 16 is a diagram of a mobile terminal and at least one external device for performing the controlling method shown in FIG. 15. Other embodiments and configurations are also within the scope of the present invention.

FIG. 16 shows that first external device 200-1 and the third external device 200-3 are spaced apart from the mobile terminal 100 within a range between a first distance (e.g., 10 m) and a second distance (e.g., 20 m). The first external device 200-1 may be located closer to the mobile terminal 100 than the third external device 200-3 within the range between the first distance and the second distance.

The mobile terminal 100 may externally transmit a paging signal of a second signal magnitude that can reach the second distance to search for an unspecific external device capable of the short-range communication. For example, operation S151 of FIG. 15 includes transmitting a paging signal for short-range communication connection.

FIG. 16 shows that the first external device 200-1 and the third external device 200-3 are spaced from the mobile terminal 100 within a range between the first distance (e.g., 10 m) and the second distance (e.g., 20 m).

The first external device 200-1 and the third external device 200-3 may receive the paging signal and then send the first and third response signals to the mobile terminal 100 in response to the received paging signal, respectively. The first external device 200-1 and the third external device 200-3 may transmit the first response signal and the third response signal in a same preset magnitude, respectively. For example, operation S152 of FIG. 15 includes at least two external devices responding to the paging signal.

The mobile terminal 100 may compare a magnitude of the first response signal and a magnitude of the third response signal. Operation S153 of FIG. 15 includes comparing magnitudes of response signals from at least two external devices. A magnitude attenuation of the response signal may be proportional to a spaced distance in transmission of the response signal since the first external device 200-1 is located closer to the mobile terminal 100 than the third external device 200-3, and a magnitude of the first response signal received by the mobile terminal 100 may be greater than the third response signal.

Since the magnitude of the first response signal is greater than a magnitude of the third response signal, the mobile terminal 100 may recognize that the first external device 200-1 is closer to the mobile terminal 100 than the third external device 200-3 within a range between the first distance (10 m) and the second distance (20 m). For example, operation S154 determining relative spaced distances of external devices.

Figure 17:
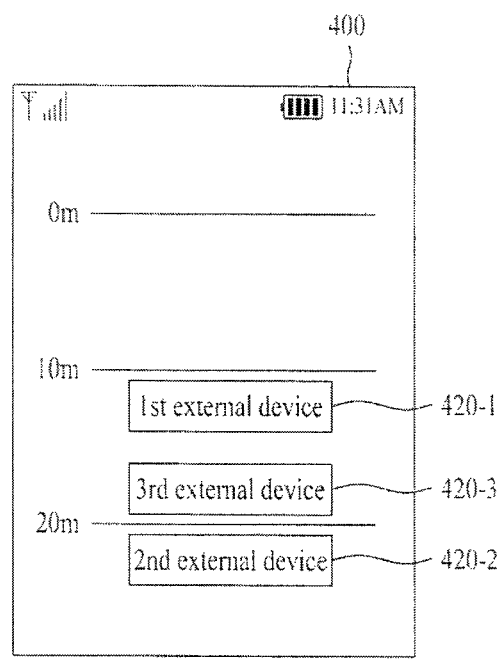
FIGS. 17 to 19 are diagrams of a display screen of a mobile terminal according to the second embodiment.
Figure 18:
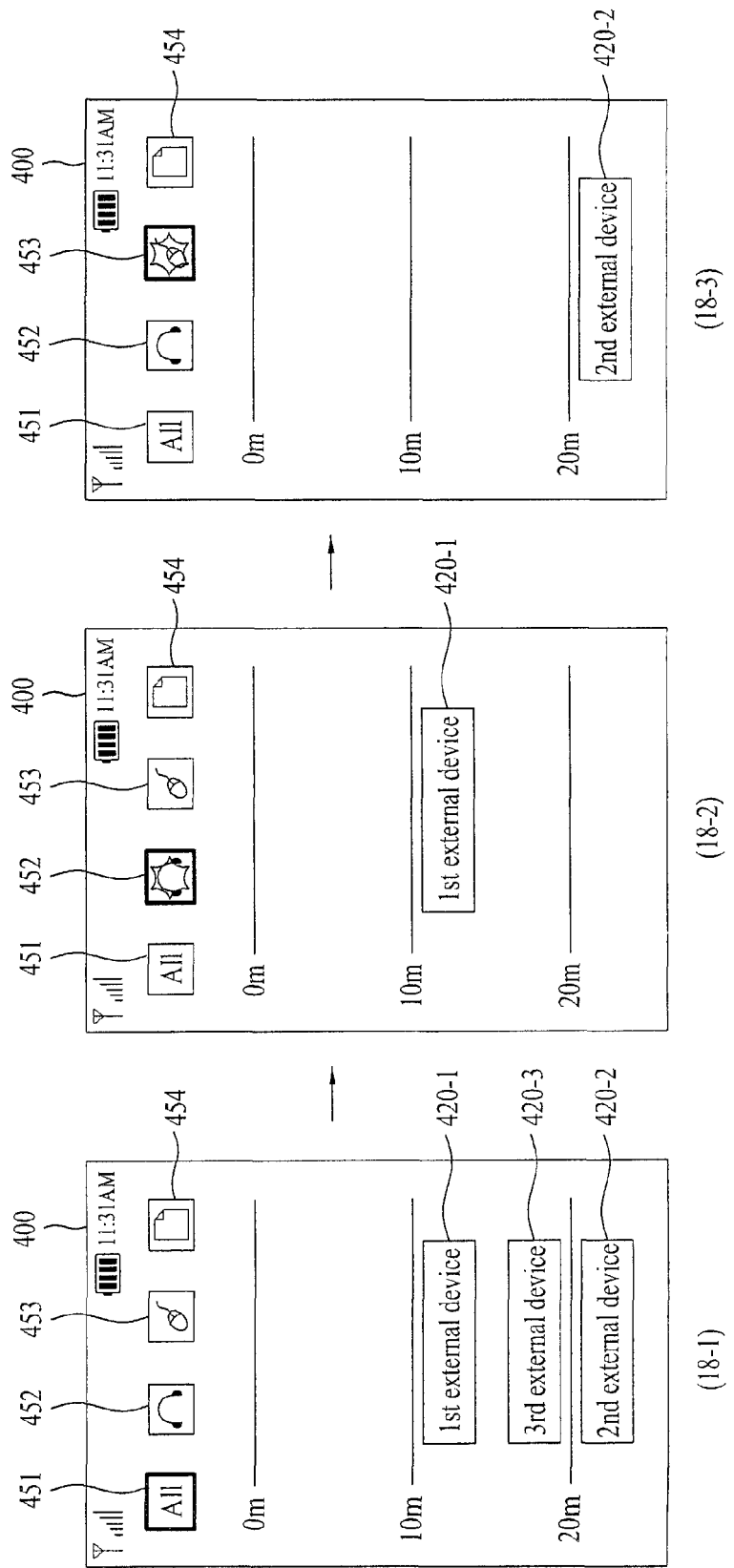

FIG. 17 and FIG. 18 are diagrams of a display screen of a mobile terminal according to the second embodiment of the present invention. Other embodiments and configurations are also within the scope of the present invention.

FIG. 17 shows that the first external device icon 420-1, the second external device icon 420-2 and the third external device icon 420-3 may be displayed on the touchscreen 400 according to distances that the external devices (i.e., the first to third external devices) are spaced apart from the mobile terminal 100, respectively.

The first external device 200-1 and the third external device 200-3 may be spaced apart from the mobile terminal 100 within a range between the first distance and the second distance. In particular, the first external device 200-1 may be spaced closer to the mobile terminal 100 than the third external device 200-3, which is displayed on the touchscreen 400.

The external devices may be displayed by being sorted according to their support functions. This may be further explained with reference to FIG. 18.

Referring to (18-1) of FIG. 18, first to fourth sorting icons 451 to 454 may be displayed on the touchscreen 400 to sort and display the external devices according to functions (or types) supported by the external devices.

In (18-1) of FIG. 18, the first sorting icon 451 may be selected to display all external devices searched irrespective of the support functions.

On the touchscreen 400, icons of the entire searched external devices (i.e., the first to third external devices) may be arranged according to spaced distances of the corresponding external devices, respectively. The searched external devices may not necessarily be arranged according to their spaced distances, respectively.

In (18-2) of FIG. 18, the second sorting icon 452 may be selected to display the external device configured to support a first function among the entire external devices.

An icon (e.g., a first external device icon) of the external device capable of supporting the first function among the entire searched external devices may be sorted on the touchscreen 400. The first external device icon 420-1 may be arranged according to a spaced distance of the corresponding external device.

In (18-3) of FIG. 18, the third sorting icon 453 may be selected to display the external device configured to support a second function among the entire external devices.

An icon (e.g., a second external device icon) of the external device capable of supporting the second function among the entire searched external devices may be sorted on the touchscreen 400. The second external device icon 420-2 may be arranged according to a spaced distance of the corresponding external device.

FIG. 18 shows that the searched external devices may be displayed on the touchscreen 400 by being sorted according to their support functions, respectively. Alternatively, the searched external devices may be displayed on the touchscreen 400 by being sorted according to a presence or non-presence of a history (stored in the memory 160) of a short-range communication with the mobile terminal 100. This may be apparent to those skilled in the art from the above description without a separate explanation and its details may be omitted for ease of description.

Figure 19:
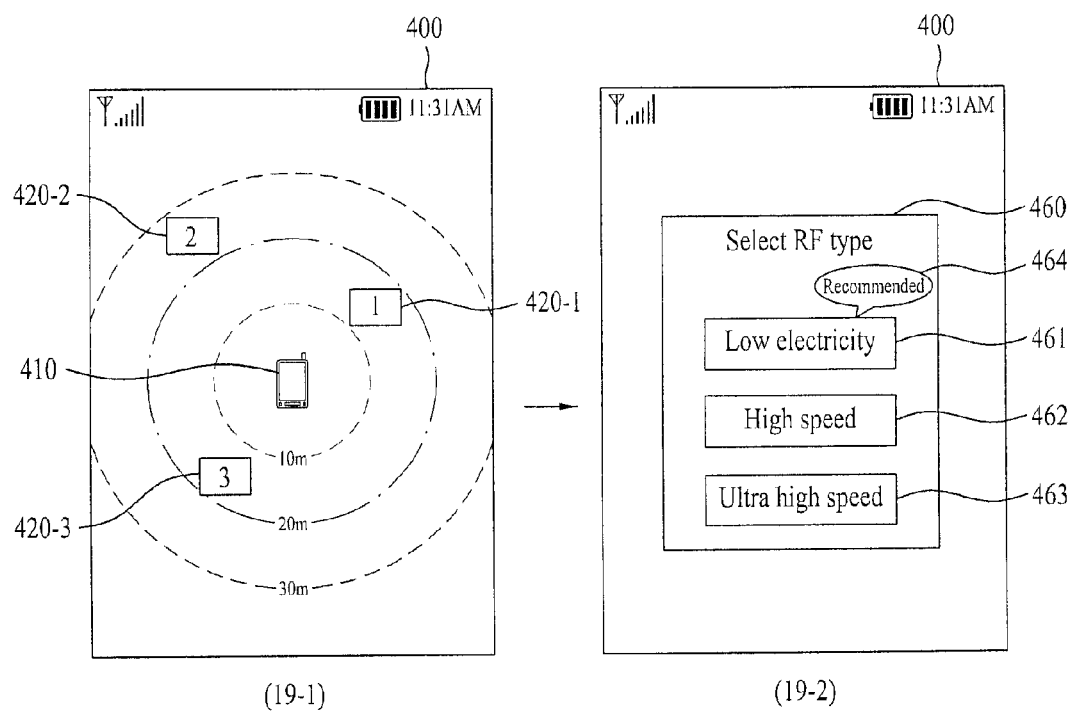

FIG. 19 shows that at least one selected external device is connected to the mobile terminal by a short-range communication.

FIG. 19 is a diagram of a display screen of a mobile terminal according to the second embodiment of the present invention.

One RF type may exist that can be supported by the external device for the short-range communication. The RF type supported by the external device can be provided to the mobile terminal 100 by being included in information of a response signal corresponding to the external device.

For example, in case that the short-range communication is Bluetooth, supportable RF types include a low electricity (LE) type, a high speed (BR/EDR) type and a ultra high speed (AMP) type.

Each of the RF types may have an advantage. For example, the low electricity type may have a low communication power consumption but its data rate may be low. The ultra high speed (AMP) type may have a high data rate but its communication power consumption may be greater than a communication power consumption of the ultra power.

Therefore, when one of the external devices is selected, if the selected external device supports at least two RF types, an RF type may be determined by which one of the selected external device and the mobile terminal 100 will be connected to each other.

Referring to (19-1) of FIG. 19, the icons 420-1, 420-2 and 420-3 of the first to third external devices searched for the short-range communications with the mobile terminal 100 may be displayed on the touchscreen 400.

For example, it is assumed that the third external device 200-3 is selected for the short-range communication via the third external device icon 420-3. Additionally, it is assumed that the third external device supports the above three kinds of RF types.

Referring to (19-2) of FIG. 19, the mobile terminal 100 may enable a terminal user to select one of the three kinds of the RF types by displaying the RF types (more particularly, icons 461, 462 and 463 of the supportable RF types) supported by the third external device 200-3 on a window 400 of the touchscreen 400.

The mobile terminal 100 may suggest at least one suitable RF type by considering at least one of a supportable function, a spaced distance and a power consumption of the third external device 200-3 to help a terminal user make a selection. For example, (19-2) of FIG. 19 shows that the low electricity (LE) RF type is recommended by a bubble message 464.

The mobile terminal 100 may not necessarily be configured to display all supportable RF types. For example, the mobile terminal 100 may display at least one suitable RF type among the entire supportable RF types. Alternatively, if only one suitable RF type exists, the mobile terminal 100 may be configured to be connected in the suitable RF type by displaying the supportable RF type without suggesting RF types to a terminal user.

Third Embodiment

In the above descriptions, at least one or more external devices may be searched for the mobile terminal 100, one of the searched external devices may be selected, and a short-range communication may then be established between the mobile terminal 100 and the selected external device.

A third embodiment of the present invention may now be explained. After the mobile terminal 100 has been connected to a prescribed external device by a short-range communication (e.g., Bluetooth), if a strength of a short-range communication signal varies between the mobile terminal 100 and the prescribed external device due to a variation of a spaced distance between the mobile terminal 100 and the prescribed external device, an execution function of the mobile terminal 100 may be changed for convenience of a terminal user.

Figure 20:
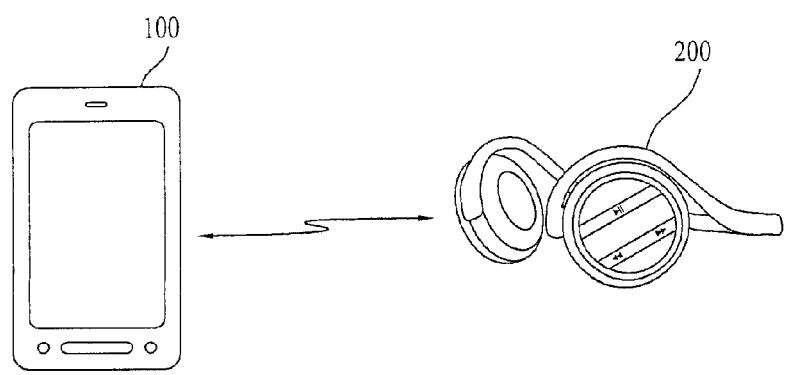
FIG. 20 is a diagram of a mobile terminal and an external device between which a short-range communication connection is established by a method of controlling a mobile terminal according to a third embodiment of the present invention.

FIG. 20 is a diagram of a mobile terminal and an external device between which a short-range communication connection is established by a method according to the third embodiment. FIGS. 21 to 25 are diagrams of a display screen of a mobile terminal according to the third embodiment. Other embodiments and configurations are also within the scope of the present invention.

FIG. 20 shows that a short-range communication connection is established between the mobile terminal 100 and a prescribed external device 200. FIG. 20 shows that the prescribed external device 200 includes a headset.

(21-1) of FIG. 21 shows that a multimedia file play function may be executed in the mobile terminal 100. The mobile terminal 100 may deliver audio of the played file to the external device 200 via the short-range communication. The delivered audio may be externally outputted through the external device 200.

The external device 200 may be spaced from the mobile terminal 100 by a prescribed distance.

(21-2) of FIG. 21 relates to the mobile terminal 100 (i.e., the controller 180) calculating a distance of the external device 200 spaced from the mobile terminal 100 using a strength of a short-range communication signal with the external device 200. If the calculated distance is equal to or greater than a prescribed reference distance, the mobile terminal 100 may turn off power supplied to the touchscreen 400 of the mobile terminal 100.

Using the strength of the short-range communication signal without considering the spaced distance of the external device 200, if the short-range communication signal is equal to or less than a prescribed strength, the mobile terminal 100 may turn off the power supplied to the touchscreen 400. Using the strength of the short-range communication signal without considering the spaced distance may be available for embodiments.

As the supply power is turned off, when the touchscreen 400 is turned off, the mobile terminal 100 may keep executing the multimedia play function or stop the execution of the multimedia play function.

If the mobile terminal 100 stops the execution of the multimedia play function, a power of the external device 200 may be turned off such that the mobile terminal 100 sends a prescribed control signal to the external device 200 via the short-range communication.

The power supply 190 of the mobile terminal 100 may be supplied with an external power (e.g., from an electric outlet).

Referring to (21-2) of FIG. 21, the power may keep being supplied to the touchscreen 400 even though the external device 200 is spaced from the mobile terminal 100 by the distance greater than the reference distance.

As the mobile terminal 100 and the external device 200 are spaced apart from each other by the distance greater than the reference distance, the touchscreen 400 may be turned off, as discussed above. However, if the spaced distance between the mobile terminal 100 and the external device 200 enters to within a range of the reference distance, the power of the touchscreen 400 may be automatically turned on.

The above description relates to turning off the power of the touchscreen 400 if the external device 200 is spaced from the mobile terminal 100 by the distance greater than the reference distance.

Embodiments may turn off the power of the touchscreen 400 after a prescribed time expires from a time point at which the external device 200 is spaced apart by the distance greater than the reference distance. If the external device 200 becomes spaced apart farther than the reference distance by a longer prescribed distance, the mobile terminal 100 may immediately turn off the power of the touchscreen 400 without waiting for expiration of the prescribed time.

An execution function of the mobile terminal 100 may be gradually changed in proportion to a spaced distance of the external device 200 that becomes spaced apart from the mobile terminal 100. This may be further explained with reference to FIG. 22.

Referring to (22-1) of FIG. 22, a multimedia file play function may be executed in the mobile terminal 100 and a prescribed multimedia file may be played back.

The external device 200 may be spaced apart from the mobile terminal 100 by a distance greater than a first reference distance.

Referring to (22-2) of FIG. 22, as the external device 200 is spaced from the mobile terminal by the distance greater than the first reference distance, the mobile terminal 100 may recognize that a strength of a short-range communication signal with the external device 200 becomes equal to or less than a first level and the mobile terminal 100 may then pause the playback of the multimedia file.

Once the spaced distance between the mobile terminal 100 and the external device 200 becomes smaller than the first reference distance, the mobile terminal 100 may resume the paused playback of the multimedia file.

It is assumed that the external device 200 may be spaced from the mobile terminal 100 by a second reference distance farther than the first reference distance instead of getting closer to the mobile terminal 100 within the first reference distance.

Referring to (22-3) of FIG. 22, as the external device 200 may be spaced from the mobile terminal 100 by a distance equal to or greater than the second reference distance, the mobile terminal 100 may recognize that the strength of the short-range communication signal with the external device 200 may become a second level or below, which is less than the first level. The mobile terminal 100 may then stop playback of the multimedia file.

Once the spaced distance between the mobile terminal 100 and the external device 200 becomes equal to or less than the first reference distance, the mobile terminal 100 may resume the stopped playback of the multimedia file.

It is assumed that the external device 200 may be spaced from the mobile terminal 100 by a third reference distance farther than the second reference distance instead of getting closer to the mobile terminal 100 within the first reference distance.

Referring to (22-4) of FIG. 22, as the external device 200 may be spaced from the mobile terminal 100 by a distance equal to or greater than the third reference distance, the mobile terminal 100 may recognize that the strength of the short-range communication signal with the external device 200 may become a third level or below, which is less than the second level. The mobile terminal 100 may then stop execution of the playback of the multimedia file play function.

Once execution of the multimedia file play function is stopped, even if the spaced distance between the mobile terminal 100 and the external device 200 enters a range of the first reference distance, the multimedia file play function may be configured to not be automatically executed.

Figure 23:
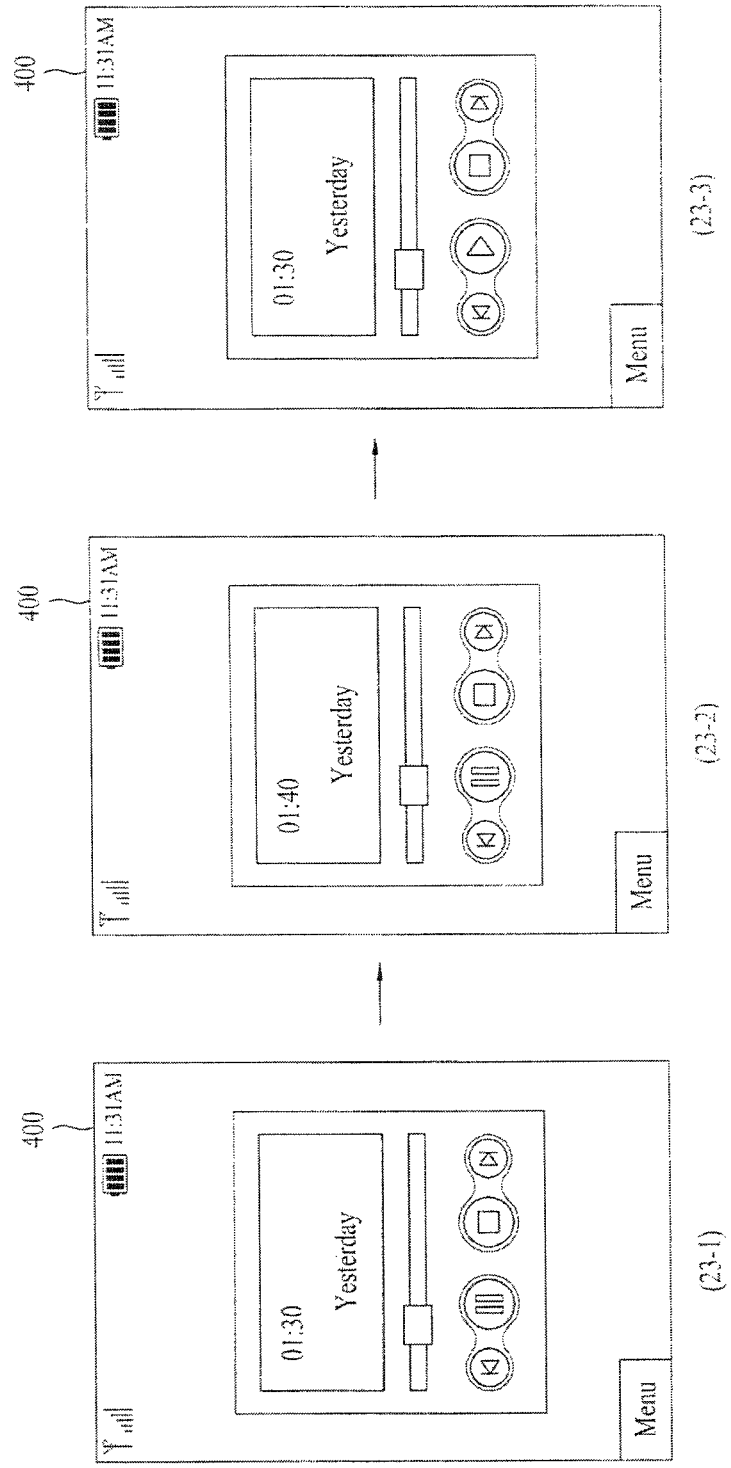

FIG. 23 relates to an example that an execution function of the mobile terminal 100 is changed at expiration of a prescribed time after the external device 200 has been spaced from the mobile terminal by a distance equal to or greater than the reference distance.

Referring to (23-1) of FIG. 23, a multimedia file play function may be executed by the mobile terminal 100 and a prescribed multimedia file may be played back.

The external device 200 may get spaced from the mobile terminal 100 by a distance greater than the first reference distance.

Referring to (23-2) of FIG. 23, after the external device 200 has been spaced apart from the mobile terminal 100, since a prescribed time (e.g., 10 seconds) fails to expire, the prescribed multimedia file may keep being played back.

The prescribed time (e.g., 10 seconds) may expire after the external device 200 has been spaced from the mobile terminal 100 by the distance greater than the reference distance.

Referring to (23-3) of FIG. 23, the mobile terminal 100 may pause the playback of the multimedia file at a timing point (e.g., 1 minute and 30 seconds) prior to the prescribed time (10 seconds) from a current play time point (e.g., 1 minute and 40 seconds).

Therefore, if the spaced distance between the mobile terminal 100 and the external device 200 enters a range of the reference distance, the mobile terminal 100 may resume playback of the multimedia file from the paused time point.

Figure 24:
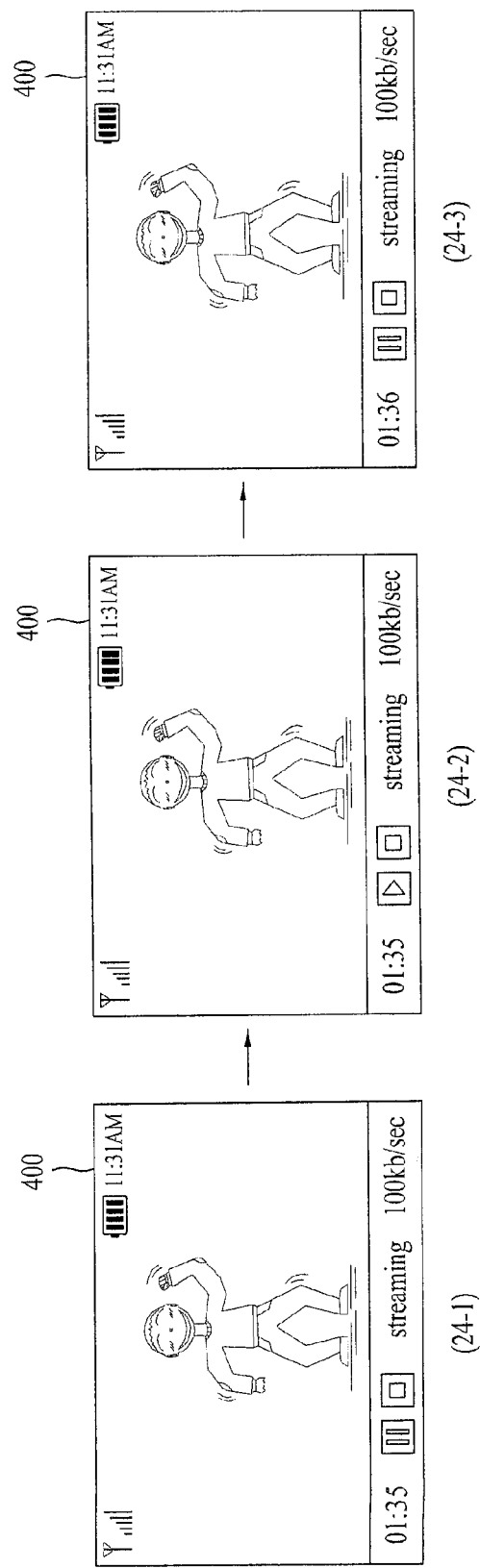

Referring to (24-1) of FIG. 24, a multimedia streaming function may be performed in the mobile terminal 100 via an Internet or broadcast network using the wireless communication unit 110. The mobile terminal 100 may receive a prescribed multimedia by streaming through the Internet or broadcast network and playing back the received multimedia.

The external device 200 may get spaced from the mobile terminal 100 by a distance greater than the reference distance.

Referring to (24-2) of FIG. 24, the mobile terminal 100 may pause playback of the multimedia and then store the multimedia received by streaming in the memory 160 from the time point at which the external device 200 is spaced apart by a distance greater than the reference distance.

The external device 200 may get spaced apart from the mobile terminal 100 within a range of the reference distance.

Referring to (24-3) of FIG. 24, the mobile terminal 100 may start to play back the multimedia stored in the memory 160 from the paused time point.

Figure 25:
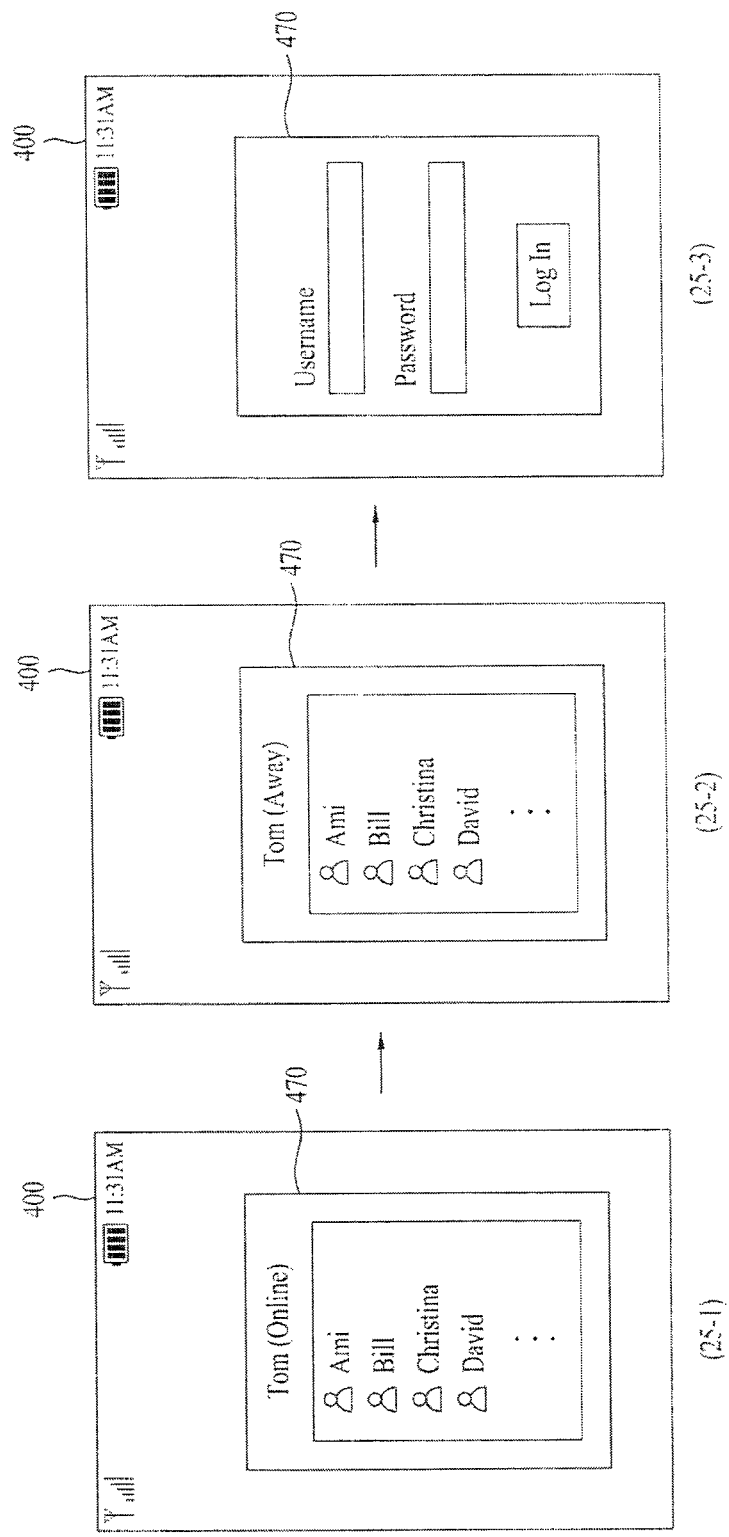

FIG. 25 will now be explained with reference to an example that an instant message function is executed in the mobile terminal 100.

Referring to (25-1) of FIG. 25, an instant message function may be executed in the mobile terminal 100. A user of the mobile terminal 100 may be logged in the instant message function. A message window 470 for the instant message function may be displayed on the touchscreen of the mobile terminal 100. The message window 470 may display that a current status of a user of the mobile terminal 100 is in a first mode (e.g., online).

The external device 200 may get spaced apart from the mobile terminal 100 by a distance greater than a first reference distance.

Referring to (25-2) of FIG. 25, as the external device 200 is spaced apart by the distance greater than the first reference distance, the mobile terminal 100 may change the current user status into a second mode (e.g., away) from the first mode.

If the spaced distance between the mobile terminal 100 and the external device 200 enters a range of the first reference distance, the mobile terminal 100 may change the current user status into the first mode again.

It is assumed that the external device 200 gets spaced from the mobile terminal 100 by a distance greater than a second reference distance farther than the first reference distance instead of getting closer to the mobile terminal 100 within a range of the first reference distance.

Referring to (25-3) of FIG. 25, as the external device 200 is spaced apart by the distance greater than the second reference distance, the mobile terminal 100 may enable the external device 200 to be logged off from the instant message function.

If the external device 200 is logged off from the instant message function, the external device 200 may be configured to not automatically log in the instant message function although the spaced distance between the mobile terminal 100 and the external device 200 enters a range within the first reference distance.

A function lock of the mobile terminal 100 may be further explained with reference to FIG. 26.

Figure 26:
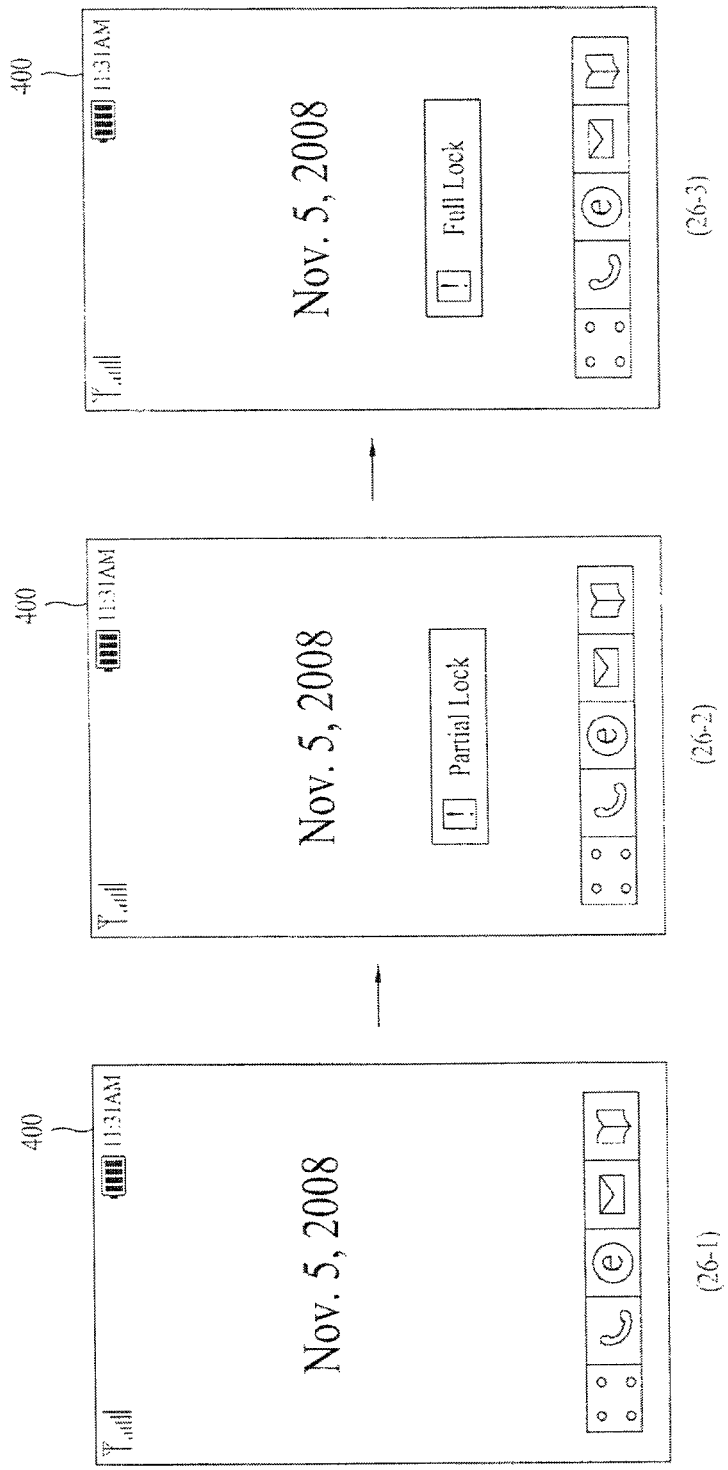

FIG. 26 is a diagram of a display screen of a mobile terminal according to the third embodiment.

Referring to (26-1) of FIG. 26, any function (menu) may not be in a locked mode in the mobile terminal 100.

The external device 200 may get spaced from the mobile terminal 100 by a distance greater than a first reference distance.

Referring to (26-2) of FIG. 26, as the external device 200 gets spaced apart from the mobile terminal 100 by the distance greater than the first reference distance, the mobile terminal 100 may enable functions of the mobile terminal 100 to enter a locked mode in part. The functions entering the locked mode may include functions related to privacy protection of the mobile terminal 100. These functions may include a message view function, a phone book function, a call history view function, etc. The functions entering the locked mode may include functions of billing charged by a mobile communication service provider in association with a use of the mobile terminal. These functions may also include a dialing function, a message sending function, an internet access function, etc.

If the spaced distance between the mobile terminal 100 and the external device 200 enters a range within the first reference distance, the mobile terminal 100 may unlock the partial locking. Alternatively, even if the spaced distance between the mobile terminal 100 and the external device 200 enters a range within the first reference distance, the mobile terminal 100 may unlock the partial locking only if a prescribed password is inputted via the user input unit 130 of the mobile terminal 100.

It is assumed that the external device 200 gets spaced apart from the mobile terminal 100 by a distance greater than a second reference distance farther than the first reference distance instead of getting closer to the mobile terminal 100 within a range of the first reference distance.

Referring to (26-3) of FIG. 26, as the external device 200 is spaced apart from the mobile terminal 100 by the distance greater than the second reference distance, the mobile terminal 100 may enable a function of the mobile terminal 100 to enter a locked mode stricter than the temporary locking (e.g., the mobile terminal 100 enters a fully locked mode).

The mobile terminal 100 may unlock the full locking if the spaced distance between the mobile terminal 100 and the external device 200 enters a range within the first reference distance.

Alternatively, even if the spaced distance between the mobile terminal 100 and the external device 200 enters a range within the first reference distance, the mobile terminal 100 may unlock the full locking only if a prescribed password is inputted via the user input unit 130 of the mobile terminal 100.

An Internet access of the mobile terminal 100 may be explained in detail with reference to FIG. 27.

Figure 27:
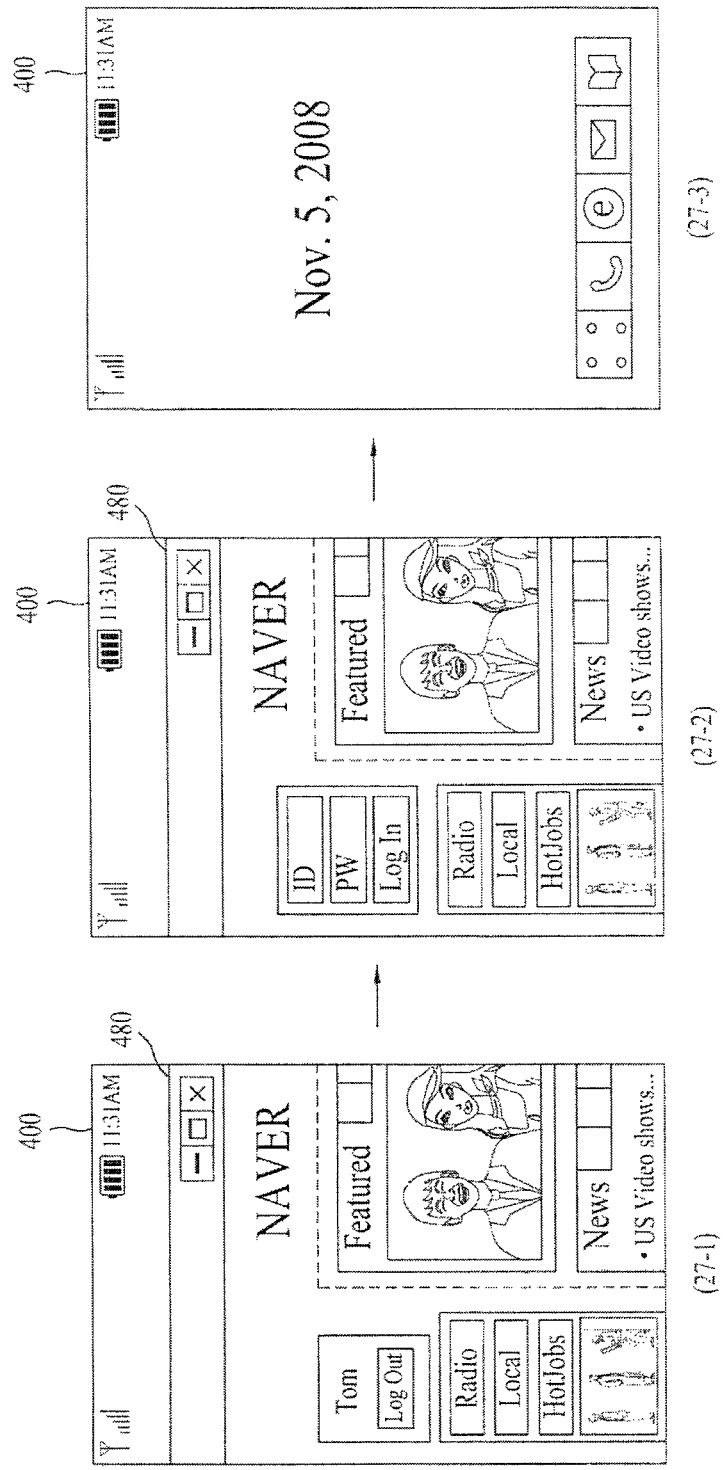

FIG. 27 is a diagram of a display screen of a mobile terminal according to the third embodiment.

Referring to (27-1) of FIG. 27, an Internet access function may be executed in the mobile terminal 100. As the mobile terminal 100 enters an Internet access, a browser window 480 for the Internet access may be displayed on the touchscreen 400. The mobile terminal 100 may be logged in a prescribed website by completing an access via the browser window 480.

The external device 200 may get spaced apart from the mobile terminal 100 by a distance greater than a first reference distance.

Referring to (27-2) of FIG. 27, the mobile terminal 100 may enable the external device 200 to be logged off from the website as the external device 200 is spaced apart from the mobile terminal 100 by the distance greater than the first reference distance.

It is assumed that the external device 200 gets spaced apart from the mobile terminal 100 by a distance equal to or greater than a second reference distance, which is farther than the first reference distance.

Referring to (27-3) of FIG. 27, as the external device 200 is spaced apart from the mobile terminal 100 by the distance equal to or greater than the second reference distance, the mobile terminal 100 may close the browser window 480 and release the Internet access.

When the external device 200 is spaced apart from the mobile terminal 100 by a distance equal to greater than a prescribed reference distance, all website accesses are not collectively logged off or the corresponding browser window 480 is not closed. After significance of each website has been pre-designated, when the external device 200 is spaced apart from the mobile terminal 100 by a distance equal to greater than a prescribed reference distance, a website having a low significance (e.g., a portal site, etc.) can be configured to keep its status and a website having a high significance (e.g., a banking account site, etc.) can be logged out of the access or the corresponding browser window may be closed.

Fourth Embodiment

Figure 28:
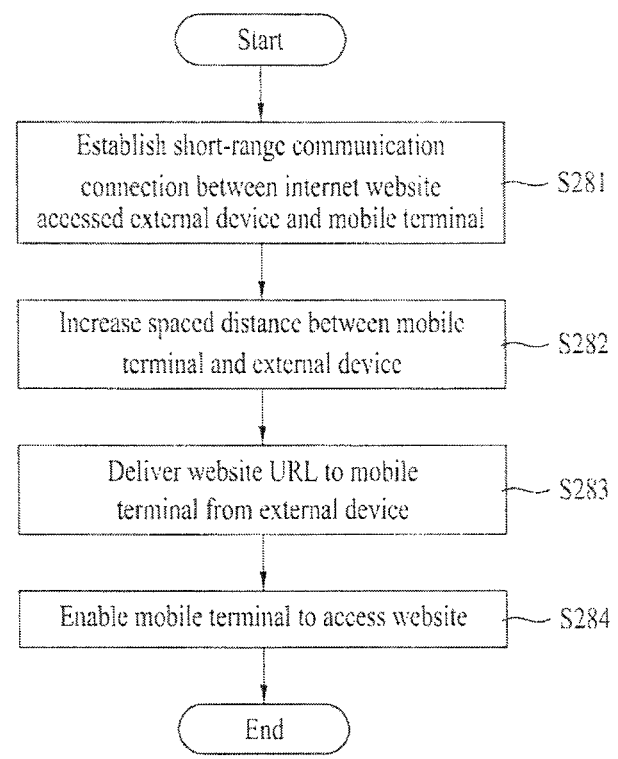
FIG. 28 is a flowchart of a method of controlling a mobile terminal according to a fourth embodiment of the present invention.

FIG. 28 is a flowchart of a method of controlling a mobile terminal according to a fourth embodiment of the present invention. FIG. 29 is a diagram of a mobile terminal and an external device between which a short-range communication connection is established by the fourth embodiment. Other embodiments and configurations are also within the scope of the present invention.

Referring to (29-1) of FIG. 29, an Internet accessible external device 200 such as a notebook computer has accessed a prescribed website and the external device 200 accesses the mobile terminal 100 by a short-range communication. For example, operation S281 of FIG. 28 includes establishing a short-range communication between an Internet website accessed external device and the mobile terminal.

A spaced distance between the external device 200 and the mobile terminal 100 may become greater than a prescribed spaced distance. For example, operation S282 of FIG. 28 includes increasing a spaced distance between the mobile terminal and the external device.

The mobile terminal 100 (i.e., the controller 180) may recognize that the spaced distance from the external device 200 may become greater than the prescribed spaced distance using a strength of a short-range communication signal.

Referring to (29-2) of FIG. 29, the mobile terminal 100 may receive a uniform resource locator (URL) of the website from the external device 200. For example, operation S283 of FIG. 28 includes delivering a website URL to the mobile terminal 100 from the external device. Reception of the URL may be performed through the short-range communication. Alternatively, reception of the URL may be performed through a different communication means.

Referring to (29-3) of FIG. 29, the mobile terminal 100 may access the website using the received URL. As shown in operation S284 of FIG. 28, the mobile terminal 100 may be enabled to access the website.

The external device 200 may release the access from the website. The external device 200 may keep accessing the website. Alternatively, when the mobile terminal 100 is spaced apart from the external device 200 by a prescribed distance, the mobile terminal 100 may execute a large-scale download update in the external device 200 or disk de-fragmentation.

Embodiments of the present invention may provide effects and/or advantages. For example, a distance spaced between a mobile terminal and a peripheral external device may be easily found. A specific one of various external devices neighboring a mobile terminal may be easily searched and may be connected to the mobile terminal by a short-range communication.

Additionally, when a mobile terminal is connected to a specific external device by a short-range communication, an execution function of the mobile terminal may be changeable by considering user's convenience according to a variation of a physically spaced distance between the mobile terminal and the specific external device.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). The computer may include the controller 180.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a user input unit;
    a display;
    a wireless communication unit to transmit signals; and
    a controller to transmit, via the wireless communication unit, a paging signal of a prescribed magnitude corresponding to a prescribed spaced distance from the mobile terminal in order to search for at least one external device within the prescribed spaced distance from the mobile terminal, and the controller to control the display to output information of the at least one external device that outputs a response signal in response to the paging signal,
    wherein the controller generates a display of a plurality of icons corresponding to execution functions, and
    wherein the controller is further configured to filter the searched at least one external device according to execution function and display an image corresponding to the filtered external device based on a selection of one or more of the plurality of icons for execution functions.

2. The mobile terminal of claim 1, wherein the controller determines that the at least one external device responds to the paging signal by the wireless communication unit receiving the response signal,
    wherein the controller determines the execution function of the at least one external device based on the received response signal.

3. The mobile terminal of claim 2, wherein the prescribed spaced distance is inputted by a user via the user input unit.

4. The mobile terminal of claim 2, wherein when at least two external devices respond to the paging signal, the controller determines an order of the at least two external devices by comparing a magnitude of a first response signals from a first one of the at least two external devices with a magnitude of a second response signal from a second one of the at least two external devices.

5. The mobile terminal of claim 4, wherein the controller determines that one of a plurality of communication types of the short-range communication is suitable for the external device based on at least one of the spaced distance, an execution function of the external device or a remaining battery power of the mobile terminal.

6. The mobile terminal of claim 5, wherein the controller controls the display to output an indication of the determined communication type.

7. The mobile terminal of claim 5, wherein the controller automatically connects the mobile terminal to the external device using the determined communication type.

8. The mobile terminal of claim 5, wherein the short-range communication is Bluetooth.

9. The mobile terminal of claim 8, wherein the plurality of communication types comprise a low speed type, a high speed type and an ultra high speed type.

10. The mobile terminal of claim 2, wherein the controller attempts a short-range communication connection with the external device that outputs the response signal.

11. The mobile terminal of claim 10, wherein the controller determines that the short-range communication connection with the external device is suitable for a short-range communication based on at least one of the spaced distance, an execution function of the external device or a remaining battery power of the mobile terminal.

12. The mobile terminal of claim 11, wherein the controller controls the display to output an indication that the external device is suitable for the short-range communication.

13. The mobile terminal of claim 2, wherein the controller determines at least one of a type of the external device or a support function of the external device based on the response signal of the external device.

14. The mobile terminal of claim 13, wherein the controller controls the display by discriminating information on the display based on one of the type or the support function.

15. The mobile terminal of claim 1, wherein the controller transmits a plurality of paging signals from the mobile terminal such that each of the paging signals increases in magnitude from an immediately preceding paging signal, wherein the controller controls a spaced distance that is calculated based on the magnitude of the external device that responds to the corresponding paging signal, and wherein the spaced distance corresponds to a distance between the corresponding external device and the mobile terminal.

16. The mobile terminal of claim 15, wherein the controller controls the display by discriminating information on the display based on the spaced distance.

17. The mobile terminal of claim 15, wherein the controller determines that the spaced distance of the external device that responds to a first one of the paging signals is closer than the spaced distance of the external device that responds to a second one of the paging signals based on the first one of the paging signals having a larger magnitude than the second one of the paging signals.

18. The mobile terminal of claim 1, wherein the image corresponding to the at least one filtered external device is positioned on the display to indicate the prescribed spaced distance of the corresponding external device.

19. A method of controlling a mobile terminal, comprising:
    transmitting a paging signal of a prescribed magnitude corresponding to a prescribed spaced distance in order to search for at least one external device within the prescribed spaced distance;
    displaying, on the mobile terminal, information of the at least one external device that outputs a response signal in response to the paging signal;
    displaying a plurality of icons corresponding to execution functions on the display;
    filtering the searched at least one external device according to execution function based on a selection of one or more of the plurality of icons for execution functions; and displaying an image corresponding to the filtered at least one external device.

20. The method of claim 19, wherein the mobile terminal determines that the at least one external device responds to the paging signal by receiving the response signal,
wherein the execution function of the at least one external device is determined based on the received response signal.

21. The method of claim 20, further comprising a user inputting the prescribed spaced distance.

22. The method of claim 20, further comprising determining an order of at least two external devices by comparing a magnitude of a first response signals from a first one of the at least two external devices with a magnitude of a second response signal from a second one of the at least two external devices.

23. The method of claim 20, further comprising attempting a short-range communication connection with the external device that outputs the response signal.

24. The method of claim 23, further comprising determining that the short-range communication connection with the external device is suitable for a short-range communication based on at least one of the spaced distance, an execution function of the external device or a remaining battery power of the mobile terminal.

25. The method of claim 24, further comprising displaying an indication that the external device is suitable for the short-range communication.

26. The method of claim 23, further comprising determining that one of a plurality of communication types of the short-range communication is suitable for the external device based on at least one of the spaced distance, an execution function of the external device or a remaining battery power of the mobile terminal.

27. The method of claim 26, further comprising displaying an indication of the determined communication type.

28. The method of claim 26, further comprising automatically connecting the mobile terminal to the external device using the determined communication type.

29. The method of claim 20, further comprising determining at least one of a type of the external device or a support function of the external device based on the response signal of the external device.

30. The method of claim 29, further comprising discriminating information on the display based on one of the type or the support function.

31. The method of claim 20, further comprising transmitting a plurality of paging signals from the mobile terminal such that each of the paging signals increases in magnitude from an immediately preceding paging signal.

32. The method of claim 31, further comprising determining that the spaced distance of the external device that responds to a first one of the paging signals is closer than the spaced distance of the external device that responds to a second one of the paging signals based on the first one of the paging signals having a larger magnitude than the second one of the paging signals.

33. The method of claim 19, wherein displaying the image corresponding to the at least one filtered external device includes positioning the image on the display to indicate the prescribed spaced distance of the corresponding external device.

* * * * *